United States Patent
Kerr et al.

(10) Patent No.: US 6,877,779 B2
(45) Date of Patent: Apr. 12, 2005

(54) CONDUIT CONNECTOR AND METHOD

(75) Inventors: Dennis Kerr, deceased, late of Ashland, OH (US); by Rita Kerr, legal representative, Ashland, OH (US); Otto Swogger, Mansfield, OH (US); Shawn Westrick, Mansfield, OH (US); John Schoonyan Jr., Bellville, OH (US); David Culler, Ashland, OH (US); Ralph G. Ridenour, Mansfield, OH (US)

(73) Assignee: Universal Tubular Systems, Inc., Mansfield, OH (US)

( * ) Notice: Subject to any disclaimer, the term of this patent is extended or adjusted under 35 U.S.C. 154(b) by 562 days.

(21) Appl. No.: 09/732,440

(22) Filed: Dec. 7, 2000

(65) Prior Publication Data

US 2001/0030422 A1 Oct. 18, 2001

Related U.S. Application Data

(63) Continuation-in-part of application No. 09/202,228, filed as application No. PCT/US97/17863 on Oct. 3, 1997, now Pat. No. 6,170,888, application No. 09/732,440.
(60) Provisional application No. 60/027,561, filed on Oct. 7, 1996, and provisional application No. 60/244,308, filed on Oct. 30, 2000.

(51) Int. Cl.[7] .......................... F16L 25/00; F16L 19/02
(52) U.S. Cl. ................ 285/382; 285/382.4; 285/382.5; 29/520; 29/523
(58) Field of Search .............................. 285/382, 382.1, 285/382.2, 382.4, 382.5, 382.7; 29/507, 520, 523

(56) References Cited

U.S. PATENT DOCUMENTS

| 2,685,461 | A | | 8/1954 | Mueller | |
|---|---|---|---|---|---|
| 3,559,946 | A | * | 2/1971 | Baxter, Jr. | 251/129.16 |
| 3,641,865 | A | * | 2/1972 | Swindt et al. | 411/361 |
| 3,787,945 | A | | 1/1974 | Pasek et al. | |
| 3,930,298 | A | | 1/1976 | Ridenour | |
| 3,934,116 | A | * | 1/1976 | Cunningham et al. | 392/501 |
| 3,977,710 | A | | 8/1976 | Ridenour | |
| 4,200,314 | A | | 4/1980 | Ridenour | |
| 4,262,942 | A | | 4/1981 | Ridenour | |
| 4,330,144 | A | | 5/1982 | Ridenour | |
| 4,450,618 | A | | 5/1984 | Ridenour | |
| 4,805,944 | A | | 2/1989 | Reginaldo | |
| 4,871,199 | A | | 10/1989 | Ridenour et al. | |
| 5,293,679 | A | * | 3/1994 | Hsu | 29/523 |
| 5,297,827 | A | * | 3/1994 | Choi | 285/351 |
| 5,573,285 | A | * | 11/1996 | Ridenour | 285/353 |
| 5,851,110 | A | * | 12/1998 | Ridenour | 431/278 |
| 6,108,895 | A | * | 8/2000 | Helsley, Jr. | 29/516 |
| 6,170,888 | B1 | * | 1/2001 | Ridenour | 285/330 |
| 6,450,553 | B1 | * | 9/2002 | Suresh | 285/382 |

* cited by examiner

*Primary Examiner*—Eric K. Nicholson
(74) *Attorney, Agent, or Firm*—Ralph E. Jocke; Daniel D. Wasil; Walker & Jocke

(57) ABSTRACT

A conduit connection joint is formed to connect a tube and a fitting body in fluid tight relation. The joint is made by axially compressing the tube in a bore in the fitting body so as to cause formation of an outwardly extending tube bead and at least one inwardly extending tube bead. The engagement of the fitting body and the tube may be further strengthened by a retaining ridge. The retaining ridge may be formed in the fitting body to engage the outwardly extending tube bead to further hold the fitting body and tube in engaged relation.

36 Claims, 29 Drawing Sheets

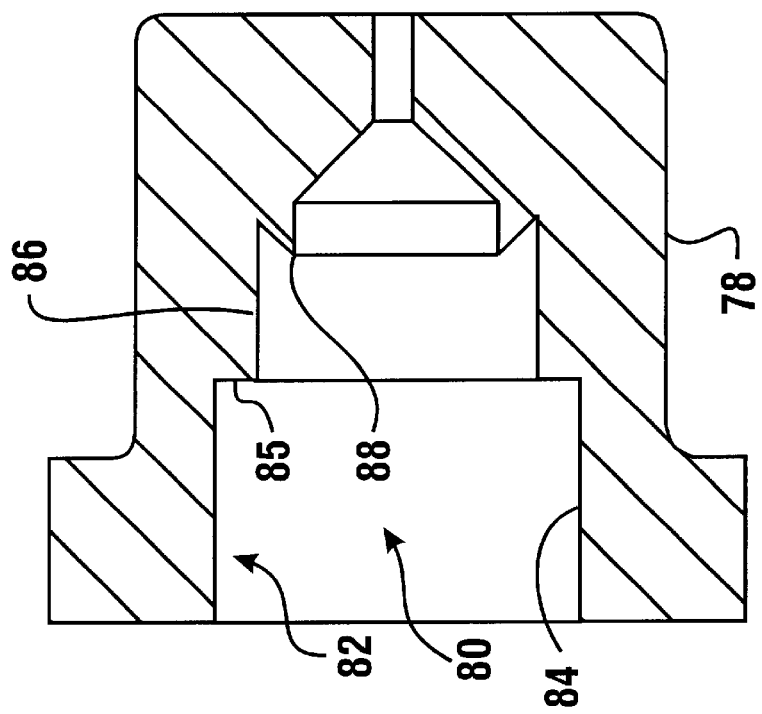
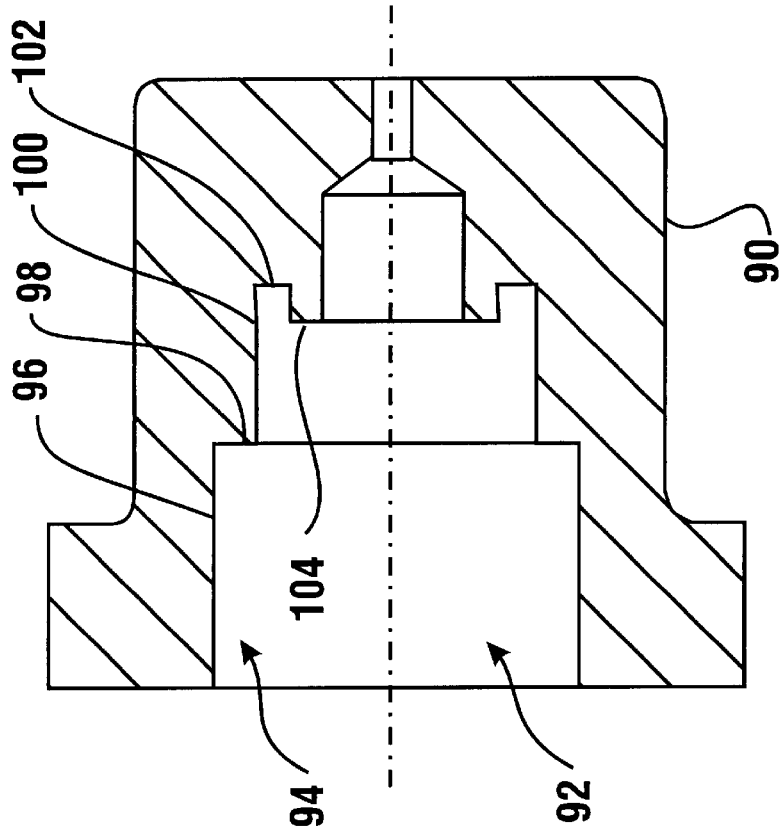
FIG. 9
FIG. 10

CONDUIT CONNECTOR AND METHOD

This application is a continuation-in-part of U.S. application Ser. No. 09/202,228 filed Dec. 9, 1998, now U.S. Pat. No. 6,170,888, which was the National Stage of International Application No. PCT/US97/17863 filed Oct. 3, 1997, which claims the benefit of U.S. Provisional Application No. 60/027,561 filed Oct. 7, 1996. This application claims the benefit of U.S. Provisional Application No. 60/244,308 filed Oct. 30, 2000.

TECHNICAL FIELD

This invention relates to conduit connectors. Specifically, this invention relates to a joint for connecting a tube and a fitting body and the method of forming the joint.

BACKGROUND ART

Many types of conduit couplings are known in the prior art. One category of conduit couplings includes tube fittings which are used to join a tube or similar conduit and a fitting body.

One variety of tube fittings includes compression fittings. Such fittings involve the use of ferrules, nuts and other component pieces for holding a tube in fluid tight connection with a fitting body. Tube fittings of this variety have drawbacks in that they include several components. Such multiple components add to the cost of the fitting. In addition, the assembly of such fittings requires several steps. The completion of these steps takes time which further adds to the cost of using such connectors. The use of several components and a multi-step assembly process also increases the chance of defects which can result in leakage or other types of failure.

Stake type fittings are also known in the prior art. Such fittings have the advantage of being low in cost and may be assembled at high production rates. Examples of prior art stake type tube fittings are shown in U.S. Pat. Nos. 3,930,928, 3,977,710, 4,200,314, 4,262,942, 4,330,144 and 4,450,618, all of which are owned by the assignee of the present invention.

While the prior art stake type tube fittings perform well, there is always a desire to improve fitting performance, increase production rates and to reduce cost.

Thus, there exists a need for a joint connection for joining a tube and a fitting body that is lower in cost, more resistant to leakage, is more rapidly assembled and has greater resistance to unwanted disassembly due to applied forces.

DISCLOSURE OF INVENTION

It is an object of the present invention to provide a joint for connecting a tube and a fitting body.

It is a further object of the present invention to provide a joint for connecting a tube and a fitting body that is a stake type joint.

It is a further object of the present invention to provide a joint for connecting a tube and a fitting body that may be assembled quickly and with automated equipment.

It is a further object of the present invention to provide a joint for connecting a tube and a fitting body that is fluid tight and which provides greater resistance to leakage at higher pressures.

It is a further object of the present invention to provide a joint for connecting a tube and a fitting body that is lower in cost to produce and assemble.

It is a further object of the present invention to provide a joint for connecting a tube and a fitting body that provides greater resistance to unwanted disassembly and breakdown.

It is a further object of the present invention to provide a joint for connecting a tube and a fitting body that may be configured in a manner that is tailored to the particular operating requirements of the system in which it is used.

It is a further object of the present invention to provide a method for forming a joint connecting a tube and a fitting body.

It is a further object of the present invention to provide a method for connecting a tube and a fitting body that may be carried out at high production rates using automated equipment.

It is a further object of the present invention to provide a method for connecting a tube and a fitting body that results in a joint that has increased resistance to leakage, increased resistance to unwanted disassembly and breakdown, and which may be configured in a manner that is tailored to the particular operating requirements of the system in which the joint is used.

Further objects of the present invention will be made apparent in the following Best Modes for Carrying Out Invention and the appended claims.

The foregoing objects are accomplished in a preferred embodiment of the invention by a joint which connects a tube and a fitting body. The joint is manufactured by a process which includes the step of axially extending a hollow tube into a bore in a fitting body. The bore in the fitting body is bounded by a generally annular bore wall. The bore wall includes a generally axially extending bead formation area. The bead formation area is radially disposed outwardly from the tube when the tube is first extended into the bore.

The process of forming the joint futher involves engaging an inward end of the tube against a stop face supported on the fitting body in the bore. Thereafter, the tube is compressed axially inward. The compression of the tube in engagement with the stop face causes the sequential formation of at least one outwardly extending bead in the tube. The one or more beads extend outwardly and engage the bore wall in the bead formation area. The engagement of the one or more beads with the bore wall provides a fluid tight joint.

In one form of the invention, after formation of the one or more beads within the bore a tool is axially extended through the fitting opening. The tool operates to axially compress the one or more beads as well as to expand the bead material outwardly into stronger interference engagement with the bore wall. The tool is then withdrawn leaving a joint which is resistant to leakage as well as highly resistant to unwanted disassembly due to internal pressure or external axial or torsional forces.

In another form of the invention the tool which is extended into the bore to compress and radially expand the one or more beads also forms a retaining ridge in the fitting body adjacent to the bore opening. The retaining ridge engages compressed bead material to resist separation of the joint.

In another form of the invention the bore wall though generally annular, includes a plurality of axially extending serrations. The serrations engage the one or more beads and provide added resistance to rotational movement of the tube relative to the fitting body.

Other forms of the invention include annular seals and other sealing structures which operatively extend between the tube and the bore to resist fluid leakage. Such seals may include combinations of annular o-rings, disc seals and sealing materials which are formed in place. The sealing structures are tailored to enable the joint to satisfactorily operate under various temperature and pressure conditions.

BRIEF DESCRIPTION OF DRAWINGS

FIG. 9 is a cross sectional view of a third embodiment of a fitting body used in a joint of the present invention.

FIG. 10 shows a cross sectional view of a fourth embodiment of a fitting body used in a joint of the present invention.

BEST MODE FOR CARRYING OUT INVENTION

Figure 1:
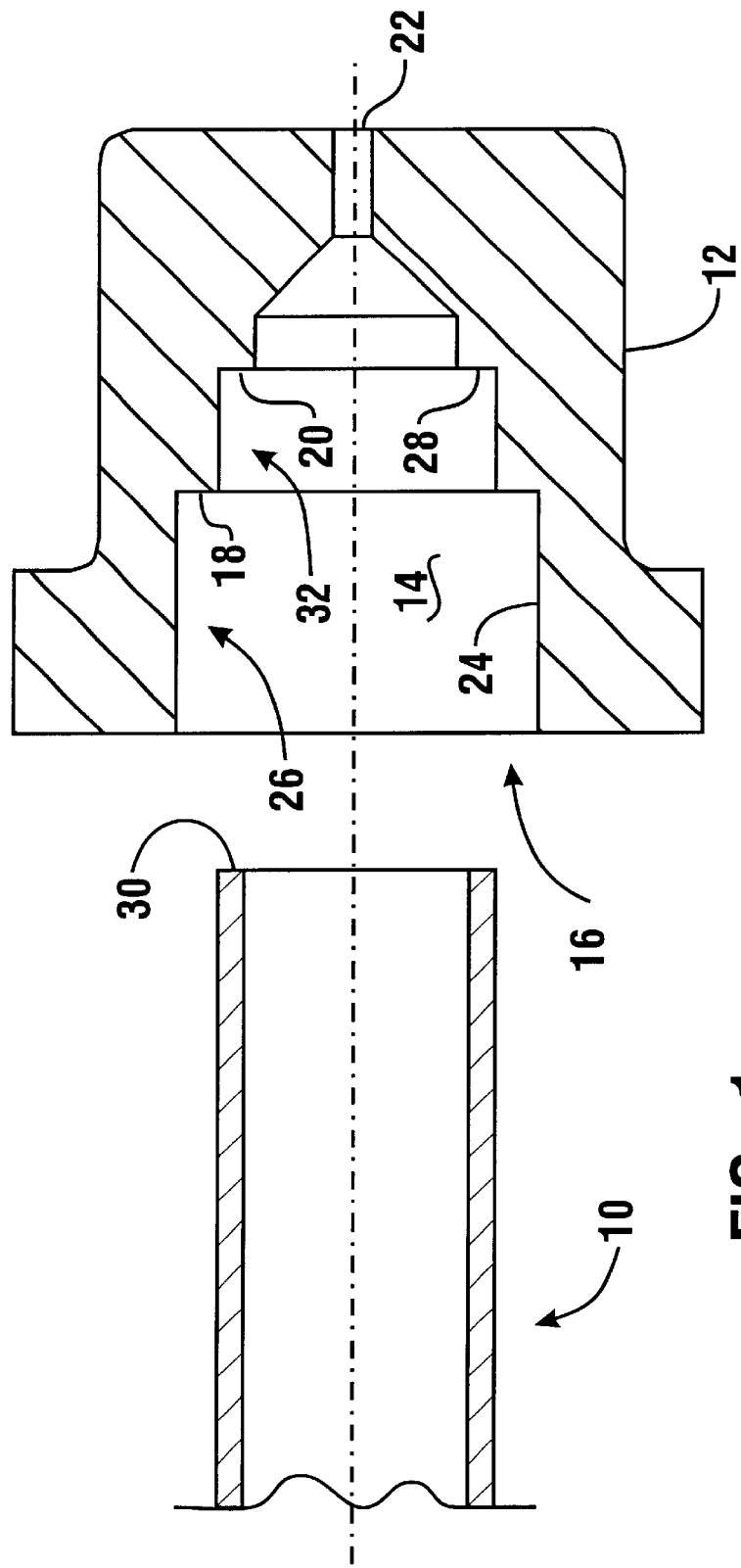
FIG. 1 is a cross sectional view of a tube and fitting body used to form the joint of a first embodiment of the present invention.

Referring now to the drawings and particularly to FIG. 1 there is shown therein a cross sectional view of a tube 10 and a fitting body 12 which are used to form a first embodiment of a joint connection of the present invention. Tube 10 is a conventional hollow tube which is comprised of a metallic material in the preferred embodiments of the invention. Tube 10 may be comprised of various types of deformable metallic materials and alloys thereof including, for example, aluminum and stainless steels.

Fitting body 12 is preferably comprised of metallic material similar to tube 10. However, in embodiments of the invention fitting body 12 need not be comprised of the same material as tube 10. In addition, in embodiments of the invention fitting body 12 may be comprised of materials which are non-metallic such as ceramic materials, high strength plastic compounds or assemblies which include such materials.

Fitting body 12 includes a bore 14. Bore 14 extends inwardly in a first axial direction from a circular bore opening 16. Bore 14 is a stepped bore in this first embodiment, and includes a first radially extending step 18. Bore 14 further includes a second radially extending step 20.

In the first embodiment of the fitting body of the invention shown in FIG. 1, bore 14 is in communication with a pilot opening 22 which extends through body 12 on a side opposed from bore opening 16. Pilot opening 22 enables fitting body 12 to serve as a nozzle such as for passing combustible gas therethrough in a pilot light application. It should be understood however that the joint of the present invention may be used for connecting numerous types of tubes and fitting bodies having various configurations and purposes.

Bore 14 is bounded by a generally axially extending annular bore wall 24. A bead formation area generally indicated 26 extends in the bore between first step 18 and bore opening 16. The function of bead formation area 26 is later explained. The bore wall 24 in this embodiment is a relatively smooth, continuous annular wall throughout the bead formation area.

Second step 20 includes a stop face 28. In the first embodiment of the fitting body of the invention shown in FIG. 1, stop face 28 is a generally annular radially extending face. Tube 10 includes an inward end 30. Inward end 30 of the tube 10 includes a generally radially extending annular face which is sized for abutting engagement with stop face 28. A sleeve area 32 extends in bore 14 between the first step 18 and second step 20. Tube 10 is also sized to have a diameter that is slidably engageable in close fitting relation into the sleeve area 32.

In forming the first embodiment of the joint, fitting body 12 is positioned in a cavity 34 in a retaining vice 36. Cavity 34 and retaining vice 36 are preferably sized for holding fitting body 12 in tight relatively immovable relation therein.

During formation of the joint, tube 10 is preferably held in a split jaw assembly generally indicated 38. Split jaw assembly 38 preferably includes a passageway 40 therethrough. In the preferred form of the invention the split jaw assembly 38 preferably includes a pair of separable jaws which are separated adjacent the passageway. The jaws are brought together to form the passageway 40 and to solidly hold tube 10 therein without collapsing it. The jaws of the split jaw assembly may be separated to release the tube. The split jaw assembly 38 preferably includes annular gripping projections 42 or other spaced projections, which extend inwardly in the passageway 40 to assist in firmly holding tube 10 therein when the split jaw assembly is in engagement with the tube.

Figure 2:
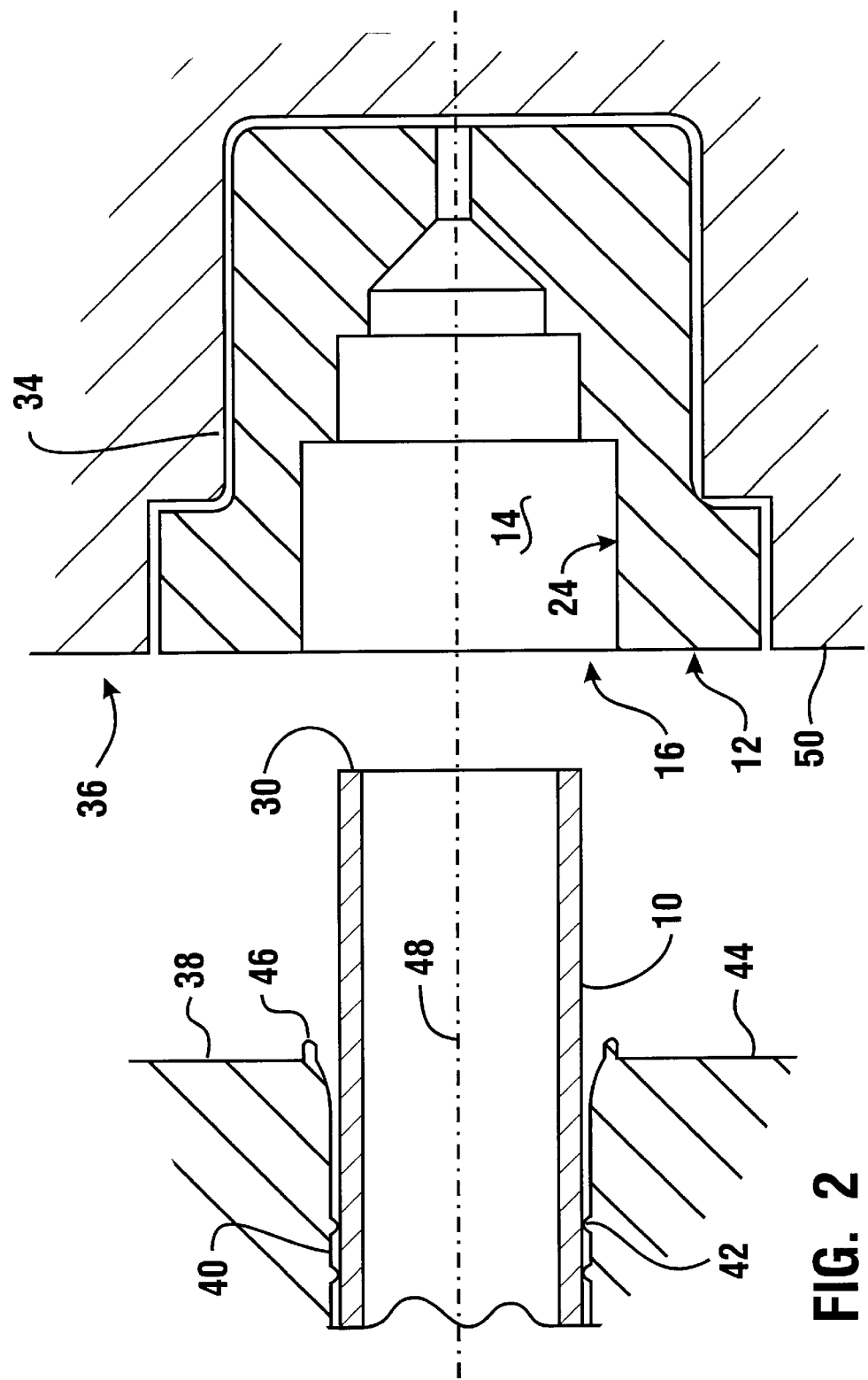
FIG. 2 is the tube and fitting body shown in FIG. 1 with the fitting body held in a retaining vice and the tube held in a pair of separable holding jaws.

Split jaw assembly 38 when in engaged relation with tube 10, provides a generally planar jaw face 44. Adjacent tube 10 on jaw face 44 is an annular, outward extending tool face or "bull nose" 46. Bull nose 46 is preferably positioned radially outwardly from tube 10 and inwardly disposed from bore wall 24 in the area of bore opening 16. It should be noted that while bull nose 46 is shown generally rounded in FIG. 2, in other embodiments the bull nose may have other configurations.

The retaining vice 36 and split jaw assembly 38 are relatively movable along an axis 48. The retaining vice and jaw assembly are preferably movable so as to bring jaw face 44 into close adjacent relation with a generally planar vice face 50 of retaining vice 36. When jaw face 44 and vice face 50 are in adjacent relation, bull nose 46 preferably extends into bore 14 for reasons which are later explained. While in the preferred embodiment of the invention the split jaw assembly is movable and the retaining vice is fixed, in other embodiments the retaining vice may be movable and the split jaw assembly relatively fixed, or both components may be movable so as to form the connecting joint hereinafter described.

Figure 3:
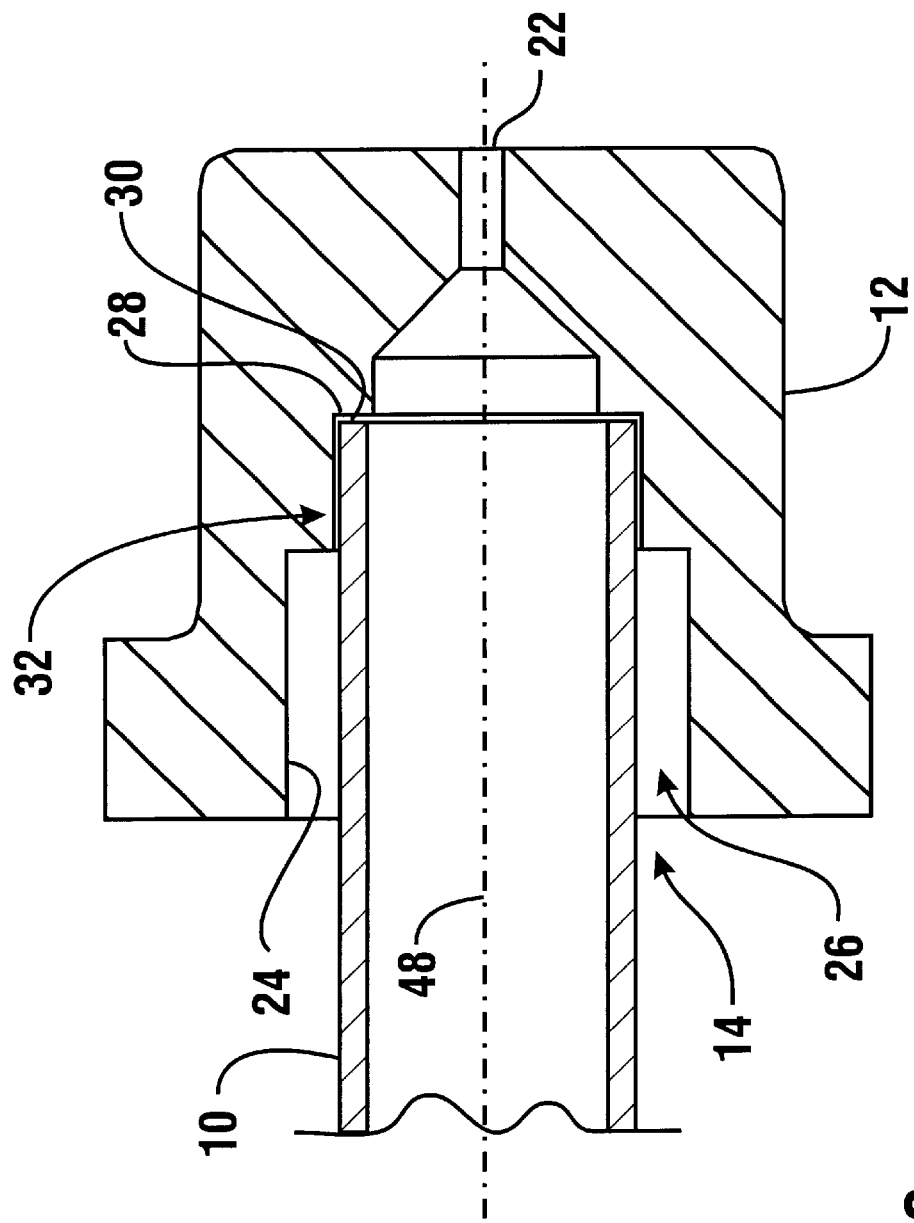
FIG. 3 is a cross sectional view of the tube and fitting body with the tube shown in a position when it is first inserted into the bore of the fitting body during a process of forming the joint.

In the process of forming the connecting joint of the first embodiment, tube 10 is moved by the split jaw assembly 38 along axis 48 in a first axial direction toward the fitting body. Tube 10 is moved so that the tube extends into bore 14 as shown in FIG. 3. The tube 10 is moved until the inward end 30 of the tube engages stop face 28 in bore 14. It should be noted that when the tube is first inserted into the bore 14 as shown in FIG. 3 the outer surface of the tube 10 is in close fitting adjacent relation with the sleeve area 32 in the fitting body. The outer wall of the tube 10 is also radially inwardly disposed from the bore wall 24 throughout the bead formation area 26.

Figure 4:
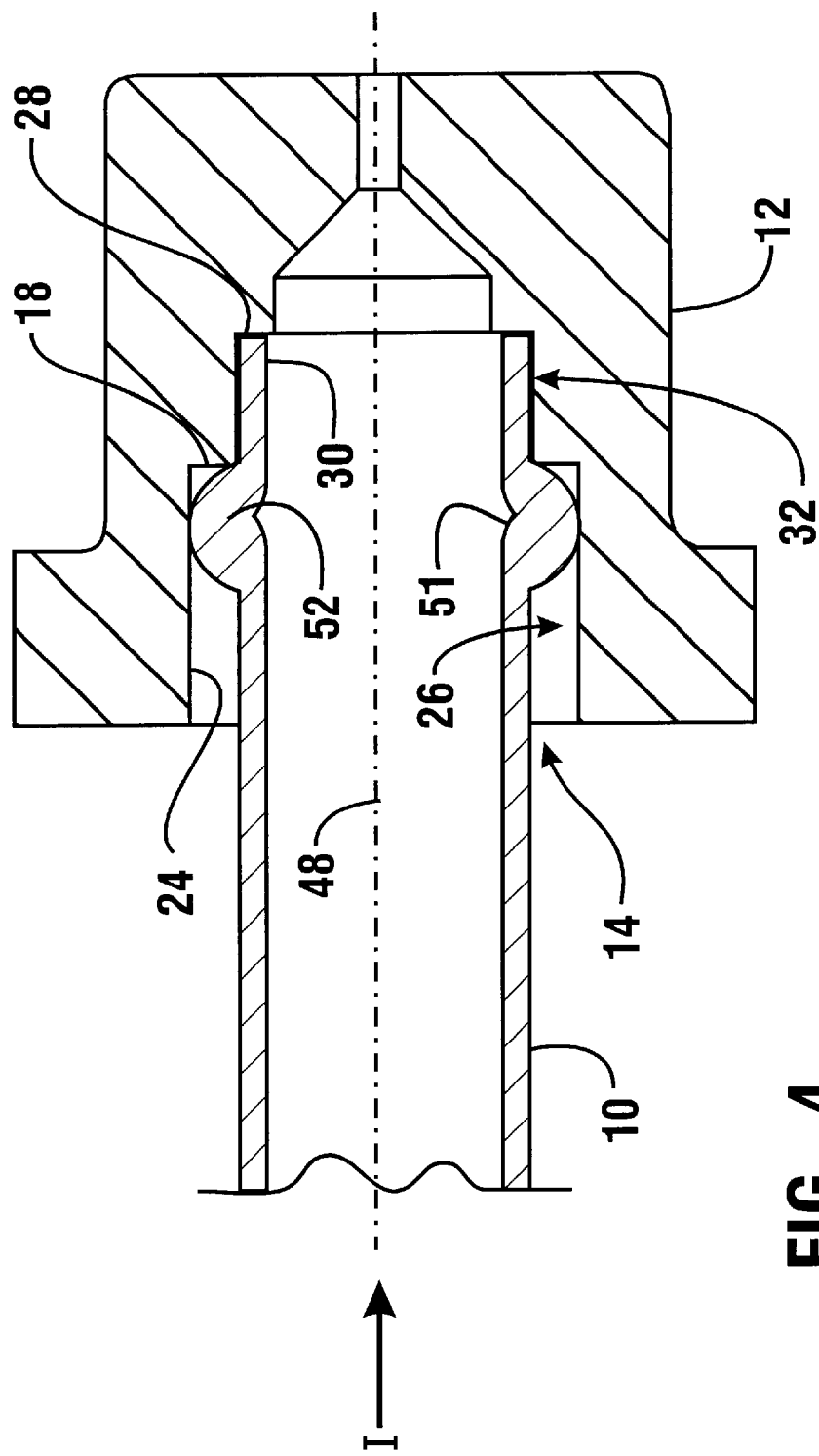
FIG. 4 is a view similar to FIG. 3 and showing a next step in the formation of the joint wherein a bead has been formed in the tube.

A next operative step in formation of the joint is shown in FIG. 4. Tube 10 is moved further radially inward in the first axial direction by the split jaw assembly as indicated by Arrow I. The inward movement of the tube compresses the material comprising the tube. The compressive force deforms the tube in the bore 14. Tube 10 is deformed at its inward end 30 so as to continuously engage the fitting body in the area of stop face 28. The compressive force further causes the tube to bulge outwardly in the bead formation area adjacent to first step 18. Tube 10 is caused to bulge outwardly because it is in close fitting engagement with sleeve area 32 and can more readily expand in the bead formation area 26.

The outward bulging of the tube in the bead formation area adjacent to first step 18 causes the formation of a first ripple or bead 52 adjacent to the first step. The first bead 52 is formed in this manner due to the properties of metallic material and the fact that metal is cold worked so as to increase its strength upon deformation. An annular arch indicated 51 forms at the inside surface of the tube as the tube undergoes compression. The arch resists plastic deformation in the area of the arch and causes the material of the tube to deform radially outward. The radially outward deformation continues until the developing bead engages the annular wall which limits further outward deformation. First bead 52 when fully formed is in engagement with first step 18 and bore wall 24. This single bead 52 may be further axially compressed and the bead material expanded outwardly, as more fully discussed hereafter. The deformed single bead material is capable of providing a fixed fluid tight engagement between the tube and the fitting body.

Tube 10 may be moved further inwardly by the split jaw assembly 38 from the position shown in FIG. 4. The further axial inward movement of the tube 10 into the bore 14 of the fitting body results in formation of a second bead 54. Second bead 54 is formed axially outwardly from bead 52 due to the cold working of the metal in the area of the first bead. As a result, a second arch indicated 53 is formed at the inner surface of the tube and further deformation occurs outwardly resulting in formation of second bead 54. The relatively strong arcuate inner surface of the tube 10 provides strength and support which results in bead formation and prevents collapse of the tube in a radially inward direction.

Second bead 54 engages the bore wall 24 in the bead formation area 26. Further, in the embodiment of the invention shown in FIG. 5 second bead 54 extends slightly outwardly from bore opening 16.

It should be understood that as the tubing 10 and fitting body 12 are moved and compressed together, the external portion of the tube which extends in the split jaw assembly is held in supported, close fitting relation in the passageway 40. This prevents the formation of beads in the tube in the area outside the bead formation area 26 within the fitting body.

Figure 5:
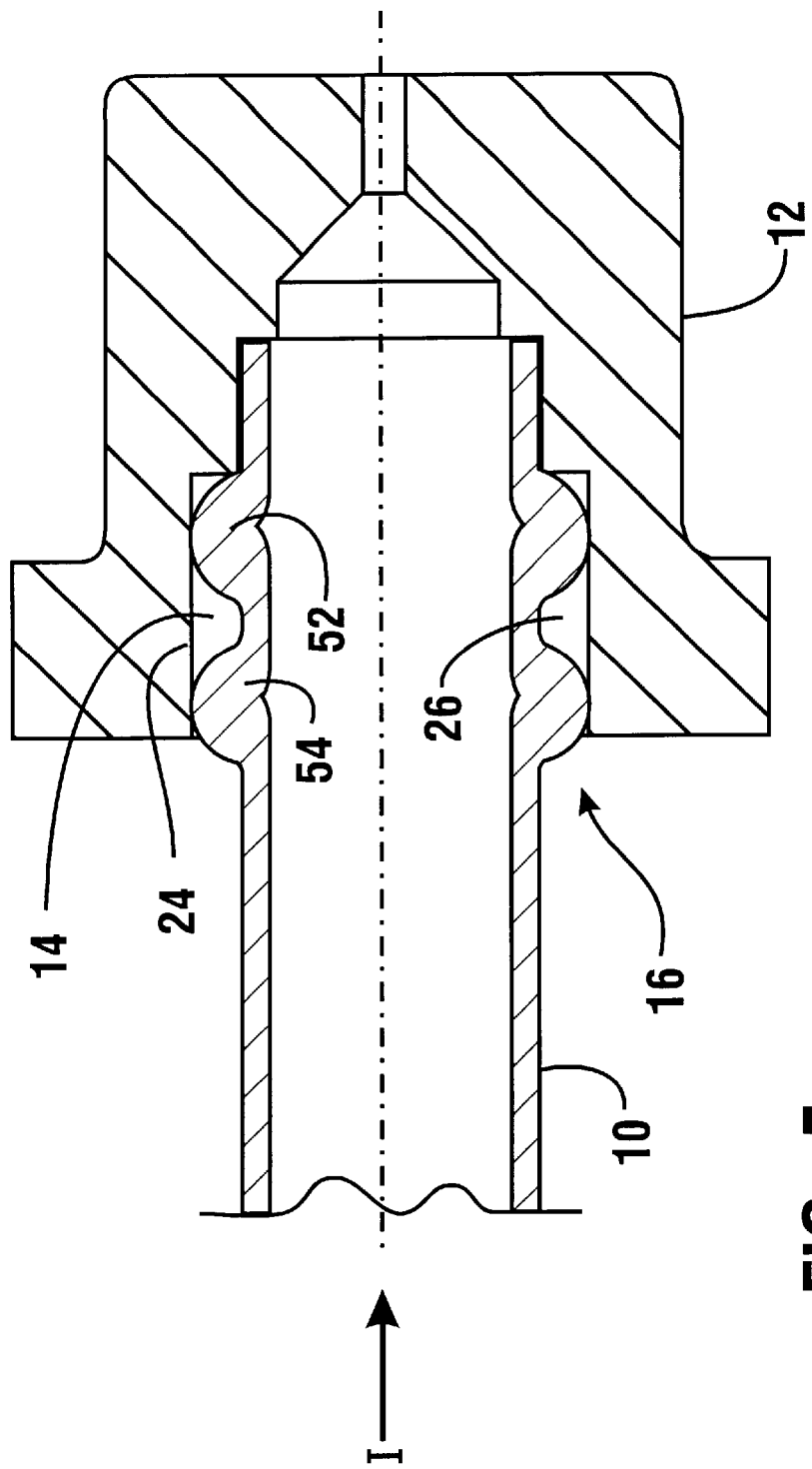
FIG. 5 is a view similar to FIG. 4 showing the next step in the formation of the joint wherein a second bead has been formed in the tube.

The first and second beads form a strong and fluid tight joint connection between the tube 10 and the fitting body 12. For some applications the double bead connection in the form shown in FIG. 5 provides a suitable leak proof connection between the tube and fitting body. In a preferred form of the first embodiment of the invention however, the beads 52 and 54 are further compressed in the axial direction and expanded radically outwardly so as to provide enhanced resistance to leakage and stronger engagement between the tube and fitting body.

Figure 6:
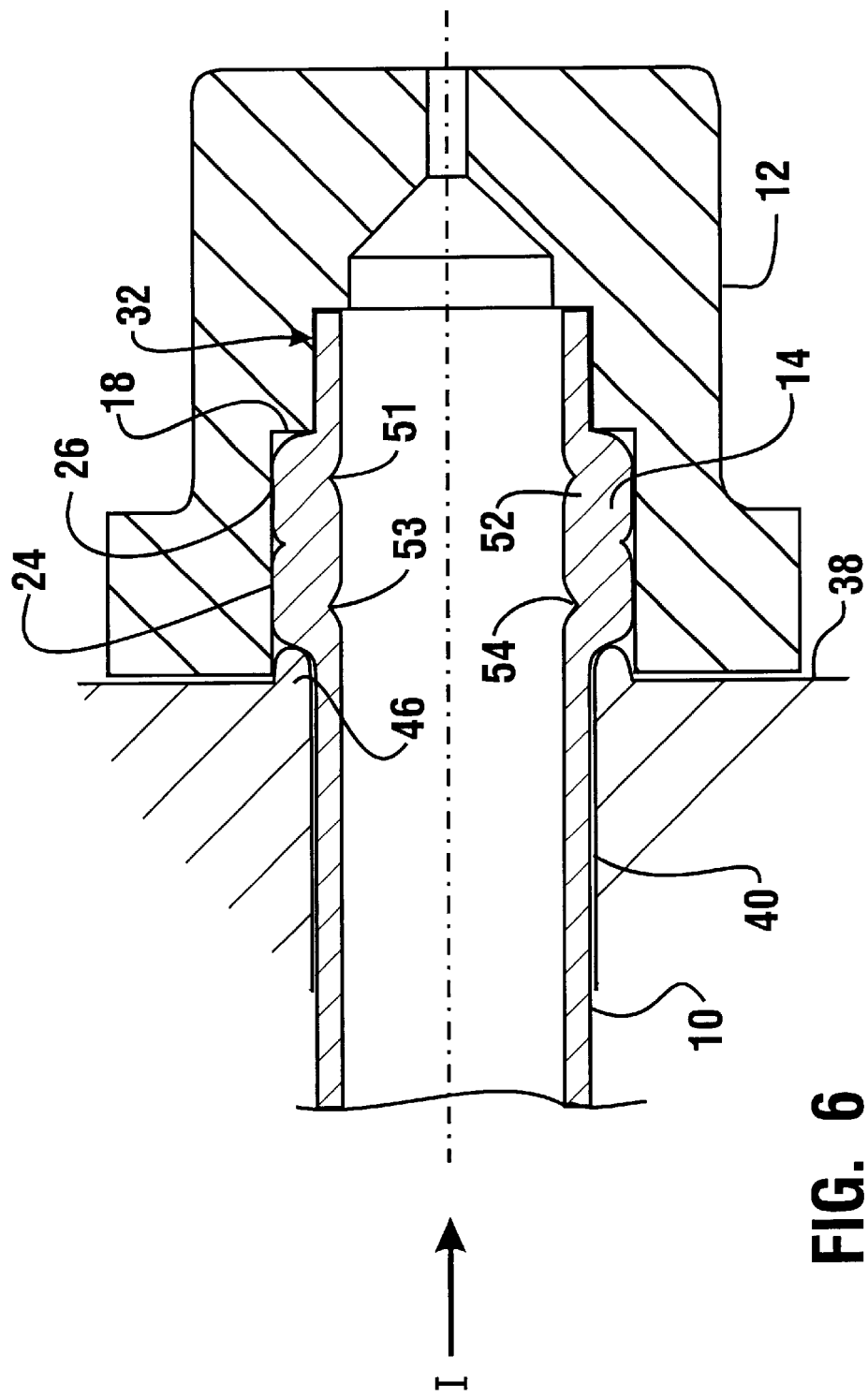
FIG. 6 is a view similar to FIG. 5 showing the next step in formation of the joint wherein the beads have been compacted axially and expanded radially outwardly.

The completion of the further process steps of axially compressing the beads and expanding the bead material outwardly is represented in FIG. 6. From the position of tube 10 shown in FIG. 5 the tube is moved further axially inwardly in the direction of Arrow I. This moves more tube material into the bead formation area. The annular tool face or bull nose 46 on the split jaw assembly 38 also moves axially inward in the bore 14. As the bull nose 46 moves inwardly it axially compresses beads 52 and 54 so they more completely fill the bead formation area 26 in the area adjacent first step 18. The deformed bead material enhances the continuous fluid tight connection of the tube and fitting body. In addition, the action of bull nose 46 further serves to radially expand beads 52 and 54 outwardly against bore wall 24. This radial expansion is aided by the movement of more material into the bead formation area as the bull nose moves inwardly. This axial compaction and radial expansion of the beads provides an enhanced interference fit between the tube 10 and the fitting body 12.

The split jaw assembly 38 is then opened to release tube 10 and the fitting body 12 is removed from the cavity 34 in the retaining vice 36. The walls of the fitting body 12 surrounding the bore 14 are preferably strong enough so that the outer surfaces of the fitting body 12 are not permanently deformed as the joint is formed. However, the beads 52 and 54 and the bore wall 24 maintain a tight interference fit both in the bead formation area 26 as well as in the sleeve area 32 after the force applied by the jaw assembly is withdrawn. This results in a strong fluid tight joint that is highly resistant to leaks and which has greater resistance to pulling apart by axial or torsional forces.

Figure 16:
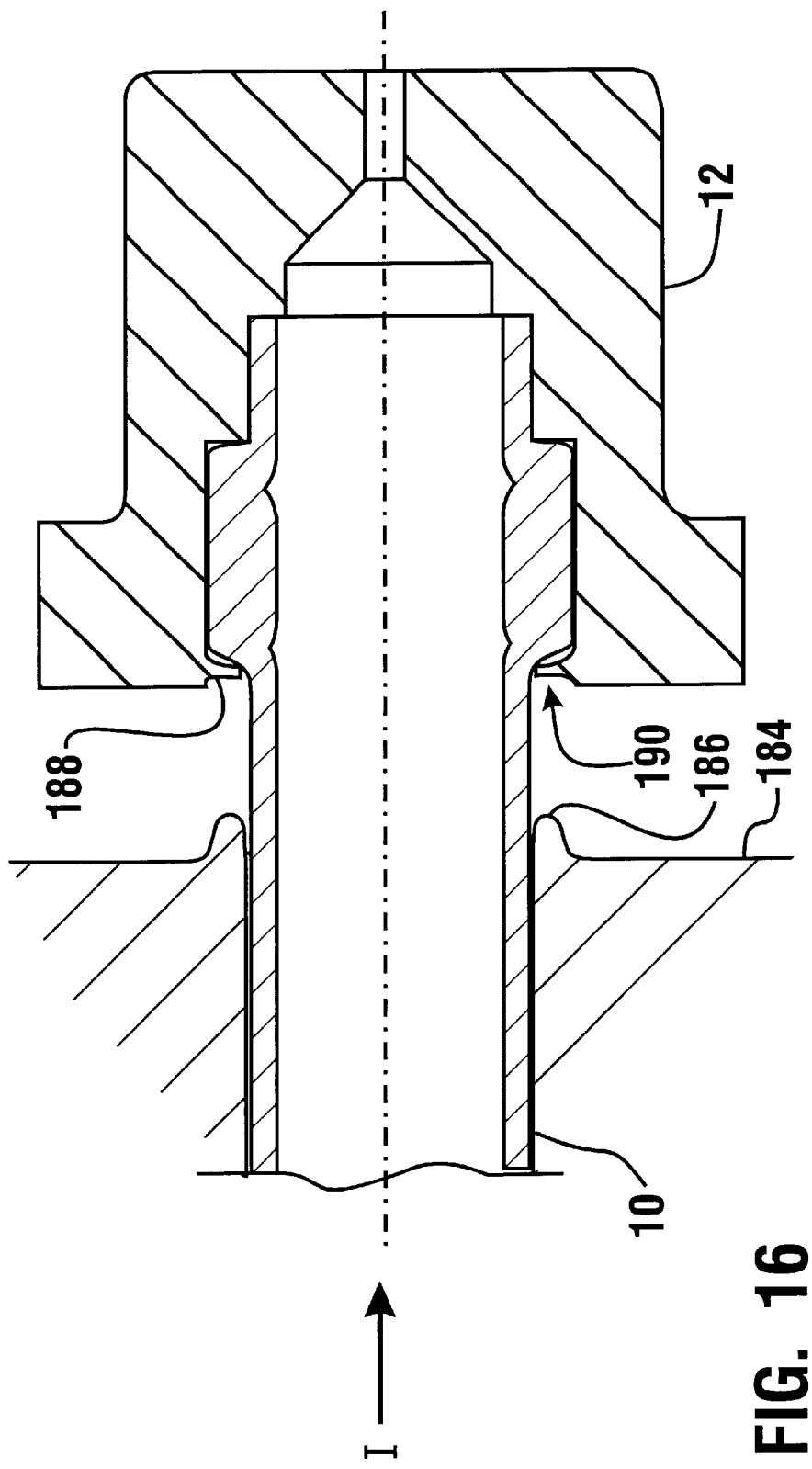
FIG. 16 is a cross sectional view of an alternative embodiment of a joint of the present invention and a split jaw assembly used in forming the joint.

Alternatively as shown in FIG. 16, a split jaw assembly 184 may be provided with an alternatively configured annular tooling face or bull nose 186. The alternative jaw assembly has the bull nose 186 configured to axially compress the bead material and expand it radially outwardly. In addition bull nose 186 is configured to deform the material of the fitting to form an inward extending annular retaining ridge 188 in the metallic fitting body 12 adjacent to the bore opening 190. Retaining ridge 188 serves to increase the resistance of the joint to axial forces acting to separate the tube and fitting body. In other embodiments the retaining ridge may comprise discrete arcuate segments instead of a fully annular ridge.

Figure 17:
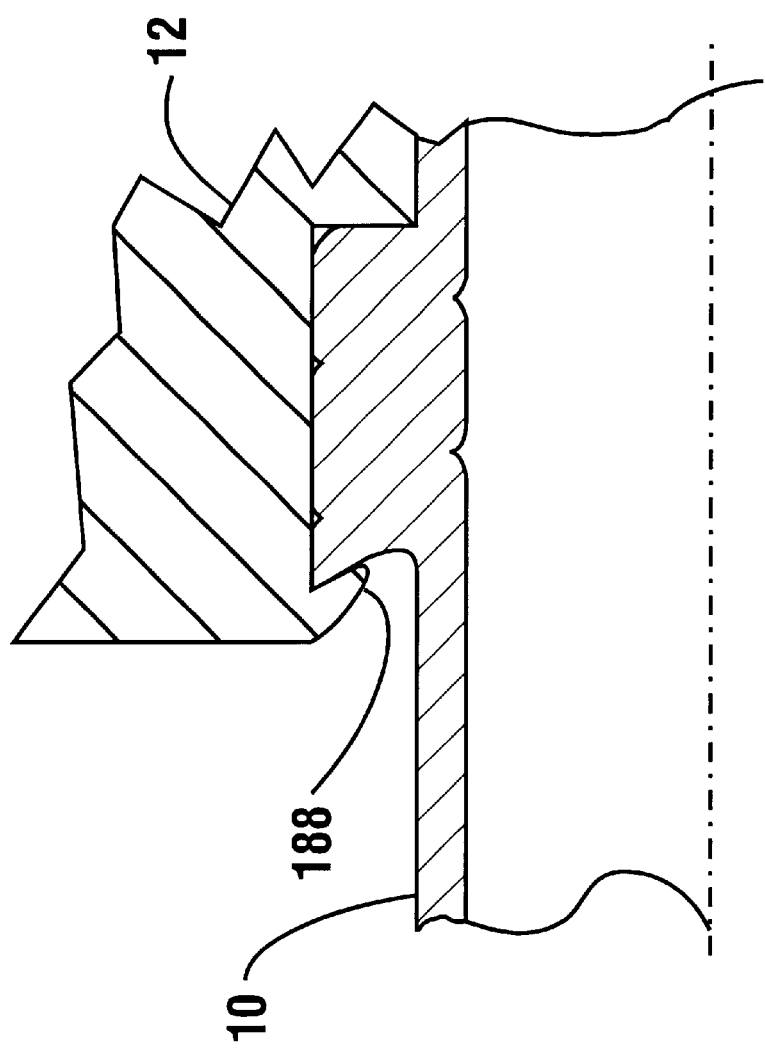
FIG. 17 is an enlarged cross sectional view of the joint shown in FIG. 16.

As shown in FIG. 17, the retaining ridge 188 is preferably formed in the fitting body so as to be tapered axially and radially inward into the bore. This configuration provides a hook-like engagement with the bead material which resists separation of the tube and fitting body. This tapered configuration also provides the advantage that pull out force on the tube results in a force by the retaining ridge which tends to radially expand the bead material. This further aids in resisting separation.

Figure 7:
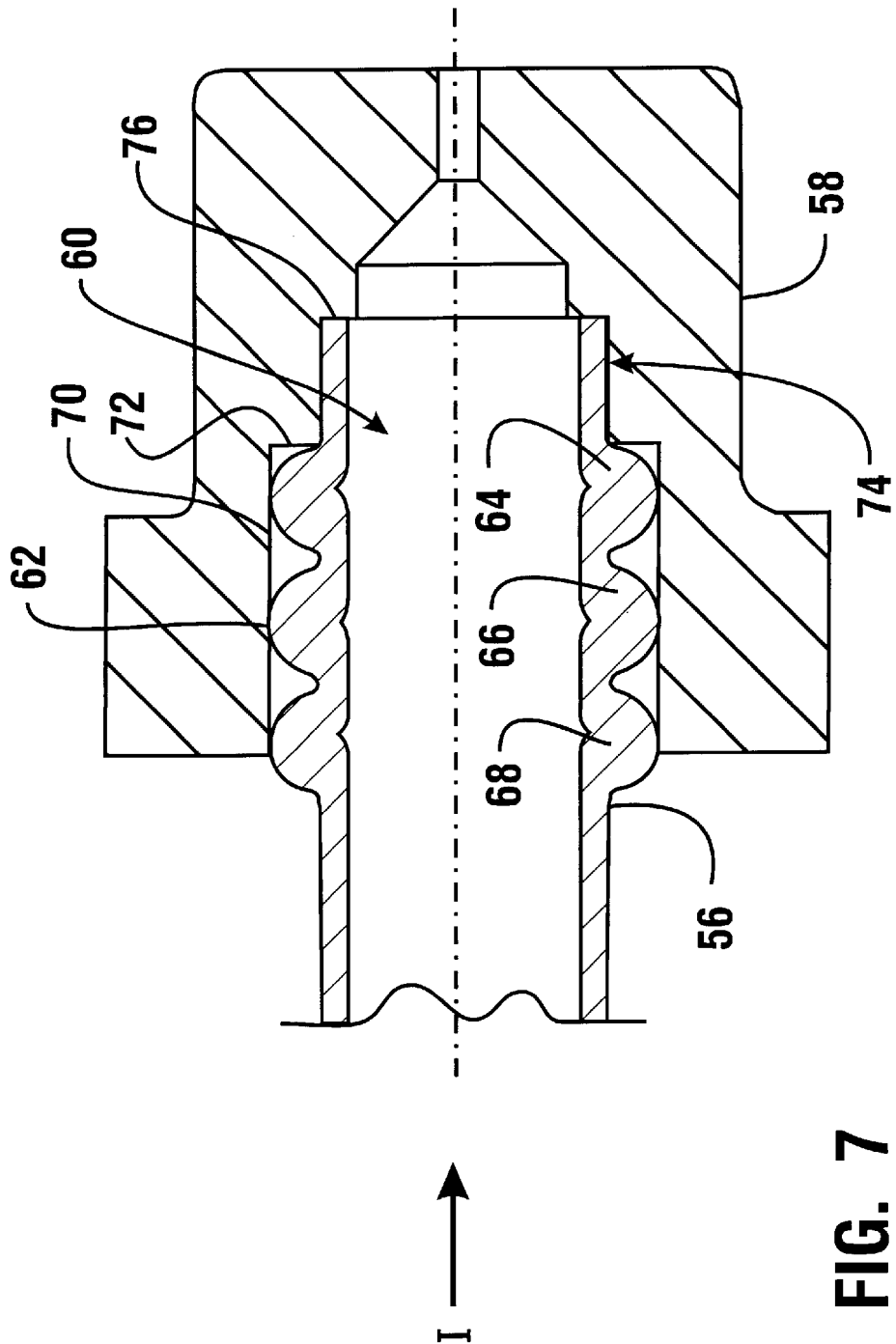
FIG. 7 is a first alternative embodiment of a joint showing a fitting body and three beads formed in a tube inserted therein.
Figure 8:
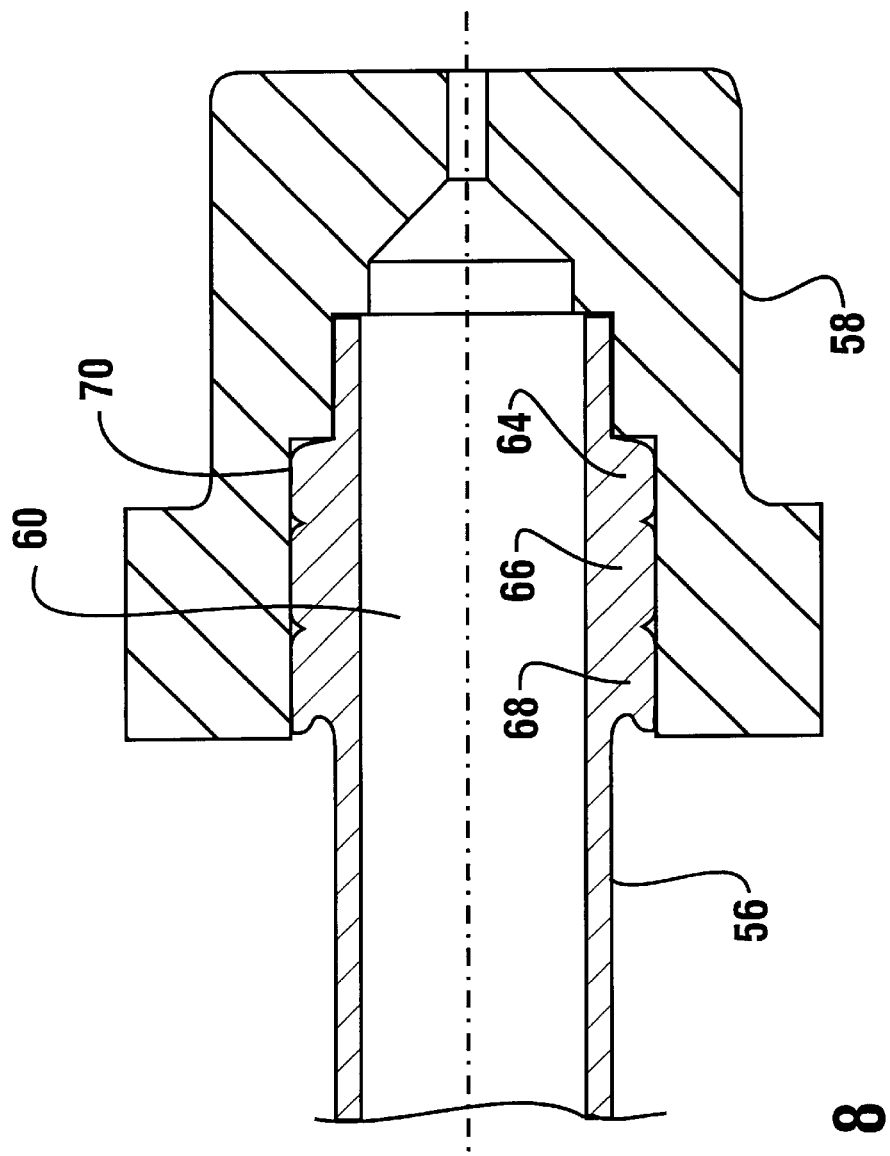
FIG. 8 shows the joint in FIG. 7 after the beads have been compacted axially and expanded radially outwardly.

A first alternative embodiment of the joint connection is shown in FIGS. 7 and 8. FIG. 7 shows a tube 56 and a fitting body 58. Fitting body 58 is similar to fitting body 12 except that it includes a bore 60 with a bead formation area 62 that is longer in the axial direction than bead formation area 26 of the previously described embodiment.

As shown in FIG. 7, movement of tube 56 in the direction of Arrow I axially compress the tube. This results in the sequential formation of three beads 64, 66 and 68. The beads are formed in the manner of the beads in the embodiments described previously.

Beads 64, 66 and 68 engage a bore wall 70 which bounds bore 60 in the bead formation area 62. In addition, bead 64 engages a first step 72 in the bore to provide a continuous fluid tight connection. The axial compression of tube 56 further provides a continuous fluid tight engagement of the tube with a sleeve area 74 in the bore, as well as with a first step 76 in a manner similar to that described for the previous embodiment.

The properties of the joint shown in FIG. 7 are further enhanced by the axial compression of beads 64, 66 and 68 as well as by the radial expansion of these beads. This is preferably accomplished in a manner similar to that previously discussed by a tool face or bull nose on a split jaw assembly or other apparatus which holds the tube 56 therein. Further, the beads 64, 66 and 68 are preferably expanded outwardly so as to form an enhanced interference fit with bore wall 70.

FIG. 8 shows the joint in FIG. 7 after the beads have undergone axial compression and radial expansion. These further steps serve to increase resistance to leakage and enable the joint to operate at higher pressures. In addition, this enhanced interference fit increases resistance to unwanted disassembly or breakdown of the joint due to torsional or axial forces. The joint of FIG. 8 may alternatively include a retaining ridge similar to that in the embodiment shown in FIGS. 16 and 17.

Alternative embodiments of the joint of the present invention may be formed using alternative configurations of tubes and fitting bodies. An alternative type fitting body that may be used in the formation of a joint connection with a round tube similar to tubes 10 and 56, is shown in FIG. 9. FIG. 9 discloses a fitting body 78. Fitting body 78 is similar to fitting bodies 12 and 58 in that it includes a bore 80 therein. Bore 80 includes a bead formation area 82 which is bounded by a generally smooth, continuous bore wall 84. Bore 80 also includes a radially extending annular first step 85.

Fitting body 78 also includes a sleeve area 86 which is sized to be in close fitting relation with a tube inserted therein. Fitting body 78 differs from the previously described embodiments in that instead of having a radially extending second step it includes a frustoconical portion 88. Frustoconical portion 88 is tapered so as to extend both radially outward and in the first axial direction from the point where it engages an inward end of a tube which is extended in the bore 80.

The process for formation of the joint connection using the fitting body 78 is similar to that of the previous embodiments. However, the frustoconical portion 88 also forces the inward end of the tube radially outwardly and deforms the tube so as to engage the sleeve area 86 in an enhanced interference fit. Frustoconical portion 88 also serves to increase the area of engagement between the inward end of the tube and the fitting body. This improves the resistance of the joint to leakage when using certain materials for the tube and fitting body. Of course, at least one bead is formed in the tube in the bead formation area 82 of fitting body 78. These one or more formed beads may thereafter be compressed in the axial direction and/or expanded outwardly so as to further strengthen the seal and interference fit between the fitting body and the tube.

A further alternative embodiment of a fitting body generally indicated 90 is shown in FIG. 10. Fitting body 90 may be used to form joint connections with a tube in a manner similar to that described with regard to the previous embodiments.

Fitting body 90 includes a bore generally indicated 92. Bore 92 includes a bead formation area 94. Bore 92 is bounded in the bead formation area 94 by a generally smooth, continuous bore wall 96. Bore 92 further includes a first step 98 similar to those of the previously described embodiments, as well as a sleeve area 100 which is sized to be in close fitting relation with a deformable metallic tube inserted therein.

Unlike the previously described embodiments, fitting body 90 includes an annular recess 102 in the bore. Recess 102 is sized for accepting an inward end of a tube therein in nested relation. Recess 102 bounds a centered cylindrical projection 104.

In formation of a joint connection using fitting 90 the joint is formed through the formation of one or more beads in the manner described with regard to the previous embodiments. However, in fitting 90 the recess 102 and cylindrical projection 104 provide added support for the inward end of the tube. In addition, this configuration provides additional surface area for sealing between the inward end of the tube and the fitting body so as to provide increased resistance to leakage.

As with the previously described embodiments, fitting 90 may be configured so as to provide for the formation of one or more bead formation area. In addition, the one or more beads so formed may thereafter be axially compressed and/or radially expanded so as to provide an enhanced interference fit between the tube and the fitting body. A retaining ridge may also be formed in the fitting body. A gasket structure may be provided in annular recess 102 to provide enhanced resistance to leakage.

Figure 15:
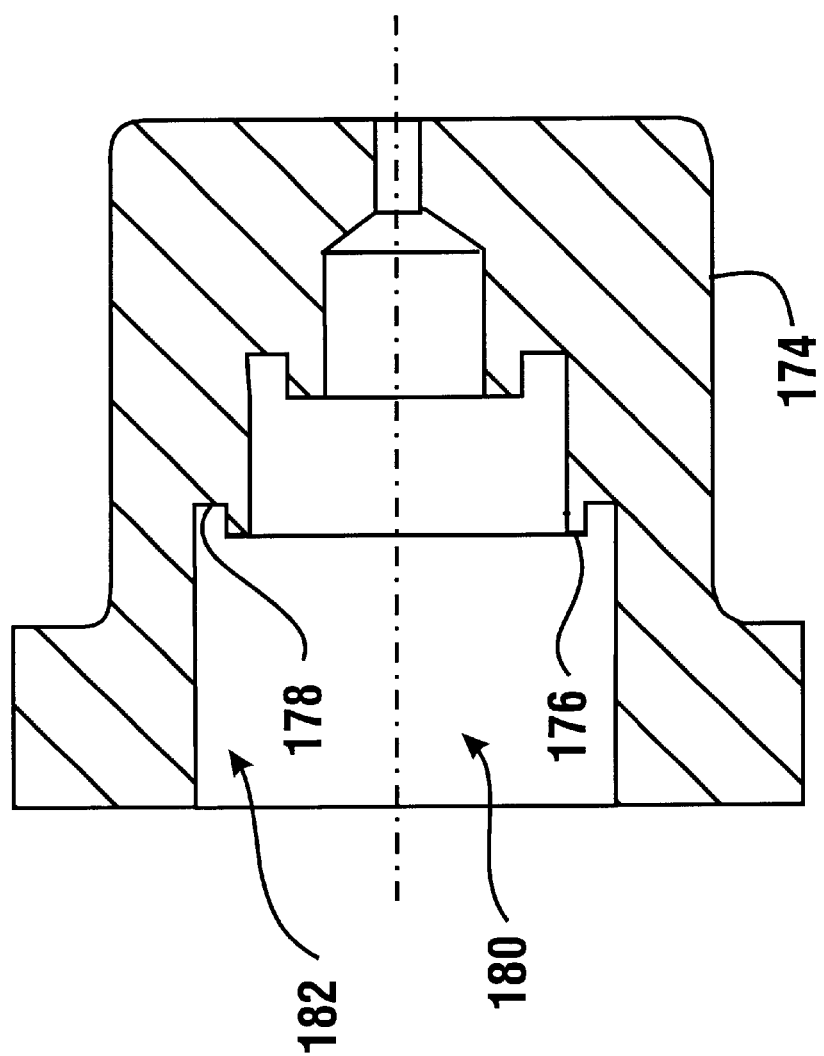
FIG. 15 is a cross sectional view of a ninth embodiment of a fitting body used in a joint of the present invention.

An alternative embodiment of the fitting body 90 is fitting body 174 shown in FIG. 15. Fitting body 174 is similar in all respects to fitting body 90 except as otherwise described.

In lieu of step 98, fitting body 174 includes an annular projection 176 which is surrounded by an annular recess 178. Upon formation of the connecting joint by axial compression of a tube in a bore 180 of fitting body 174, one or more annular beads are formed in a bead formation area 182. Upon further axial compression of the bead material of the tube, the bead material is deformed into packed engagement with the projection 176 and recess 178. Thus enhances sealing and increases the strength of the joint connection. Alternatively, gasket structures may be provided in one or both of the radially extending annular recesses of fitting body 174.

Figure 11:
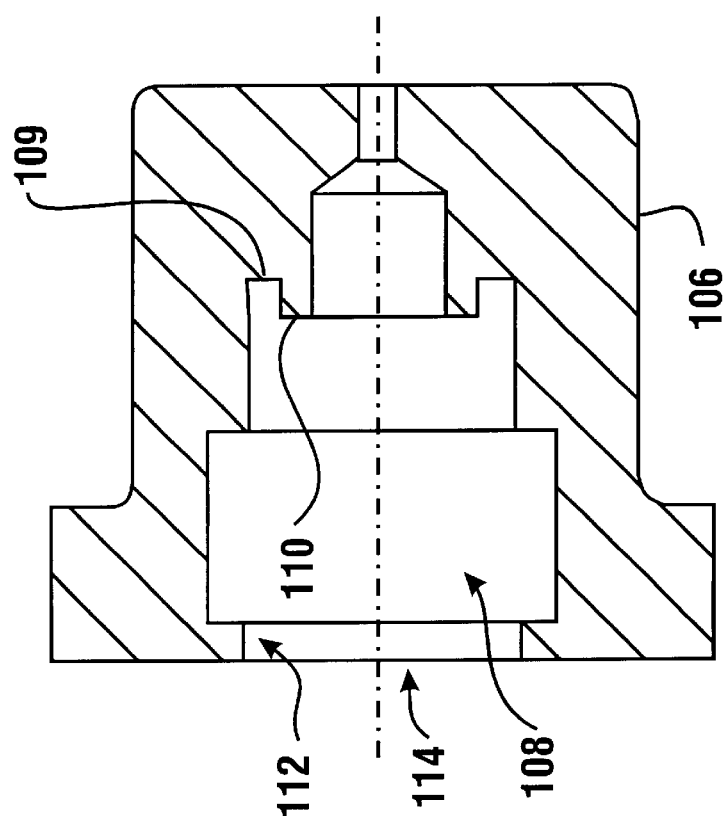
FIG. 11 is a cross sectional view of a fifth embodiment of a fitting body used in a joint of the present invention.

A further embodiment of a fitting body 106 used with a joint connection of the present invention is shown in FIG. 11. Fitting body 106 is similar to fitting body 90 in that it includes a bore 108 which includes a recess 109 and a centered, raised cylindrical area 110.

Unlike fitting body 90 however, bore 108 of fitting body 106 includes an annular inward extending projection 112. Annular projection 112 extends adjacent to an opening 114 of the bore.

In formation of a joint connection using fitting body 106 a tube is axially compressed so as to form at least one bead in a bead formation area within bore 108. The bead formation area is axially sized so the outer bead in the tube is formed in a location so that it engages an interior surface of annular projection 112. Such engagement strengthens the joint connection by providing enhanced resistance to separation due to axial forces. In addition, like the joints of the prior embodiment, a bull nose or other properly sized tool face may be used to axially compress and radially expand the one or more beads formed in the bore if it is desired to increase the engaging forces which provide sealing and an enhanced interference fit between the tube and fitting body. The annular projection may also be deformed in a manner similar to the retaining ridge of embodiments previously described.

Figure 12:
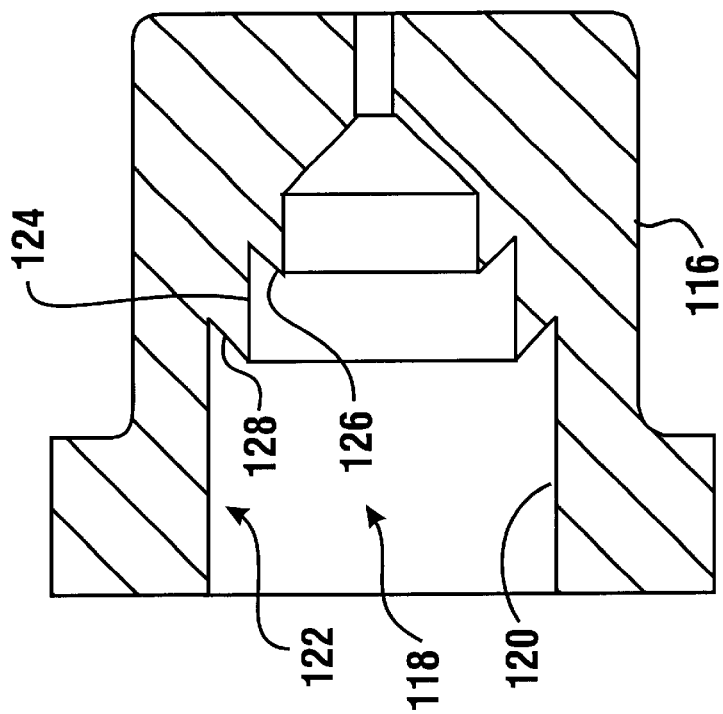
FIG. 12 is a cross sectional view of a sixth embodiment of a fitting body used in a joint of the present invention.

A further embodiment of a fitting body 116 used with a joint connection of the present invention is shown in FIG. 12. Fitting body 116 is similar to fitting body 78 as shown in FIG. 9 except as otherwise described. It includes a bore 118 which is bounded by a bore wall 120 in a bead formation area 122. The fitting body 116 further includes a sleeve area 124 and a first frustoconical portion 126.

Fitting body 116 further includes a second frustoconical portion 128 extending between the sleeve area 124 and the bore wall 120. Second frustoconical portion 128 is tapered to extend both radially outward from the sleeve area in the fitting body and in the first axial direction.

In the process of forming the joint of the invention using fitting body 116, first frustoconical portion deforms the tube outwardly to engage the sleeve area 124 in an enhanced interference fit and increases the area of engagement between the inward end of the tube and the fitting body as in the embodiment shown in FIG. 9. Second frustoconical portion 128 serves to increase the surface area for engagement with the one or more beads formed in bead formation area 122, particularly when such beads are axially compressed. The taper of the second conical portion 128 further tends to move the axially compressed bead material radially outward during axial compression to engage the bore wall. This further strengthens the connection of the tube and the fitting and reduces the risk of leakage.

Figure 13:
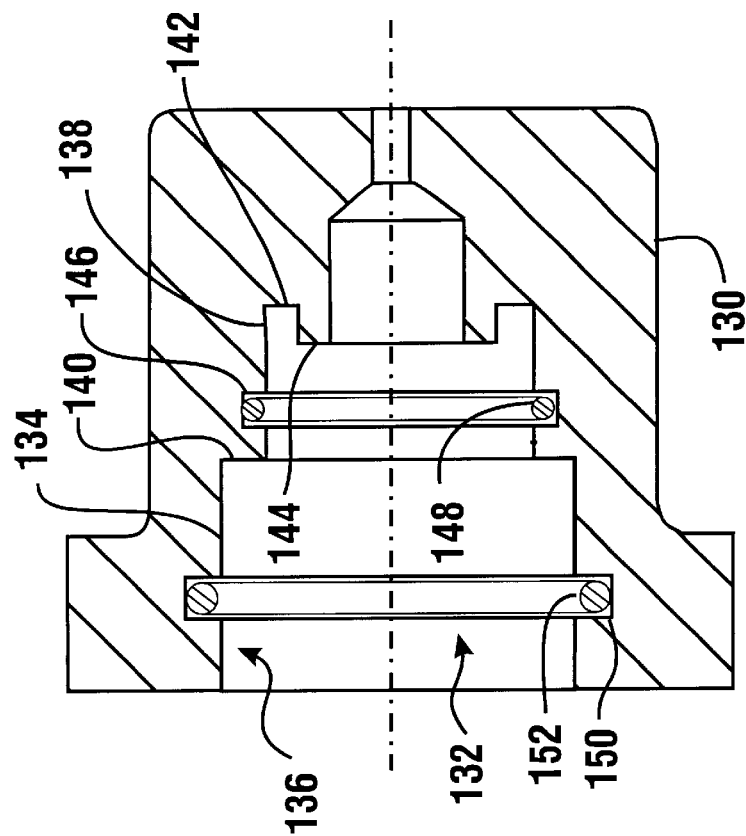
FIG. 13 is a cross sectional view of a seventh embodiment of a fitting body used in a joint of the present invention.

A further alternative embodiment of a fitting body generally indicated 130 is shown in FIG. 13. Fitting body 130 is similar to fitting body 90 shown in FIG. 10 except as otherwise noted. The body includes a bore 132 bounded by a bore wall 134. Adjacent the bore wall 134 is a bead formation area 136. Fitting body 130 includes a sleeve area 138. An annular step 140 extends between the sleeve area and the bead formation area 136. Body 130 further includes an annular recess 142 which bounds a cylindrical projection 144.

Body 130 includes a first annular groove 146. Groove 146 extends in the sleeve area intermediate the recess 142 and step 140. A resilient first seal or o-ring 148 is nested in groove 146. A second annular groove 150 extends in bore wall 134. A resilient second seal or o-ring 152 is nested in groove 150.

In the process of forming the joint of the invention using the fitting body 130 a tube is deformed in the bore in the manner previously described with regard to FIG. 10. However, the first o-ring 146 in the sleeve area 138 provides further sealing action between the tube and fitting body in the sleeve area. Likewise, second o-ring 152 provides further sealing action between the fitting body and the tube in the bead formation area 136.

It should be understood that while in fitting body 130 two annular grooves and o-rings are shown, in other embodiments one of the grooves or o-rings may be eliminated. In other embodiments multiple grooves and o-rings may be provided in either the sleeve area or the bead formation area of the fitting body. Alternatively a gasket structure may be provided in annular recess 142.

Figure 14:
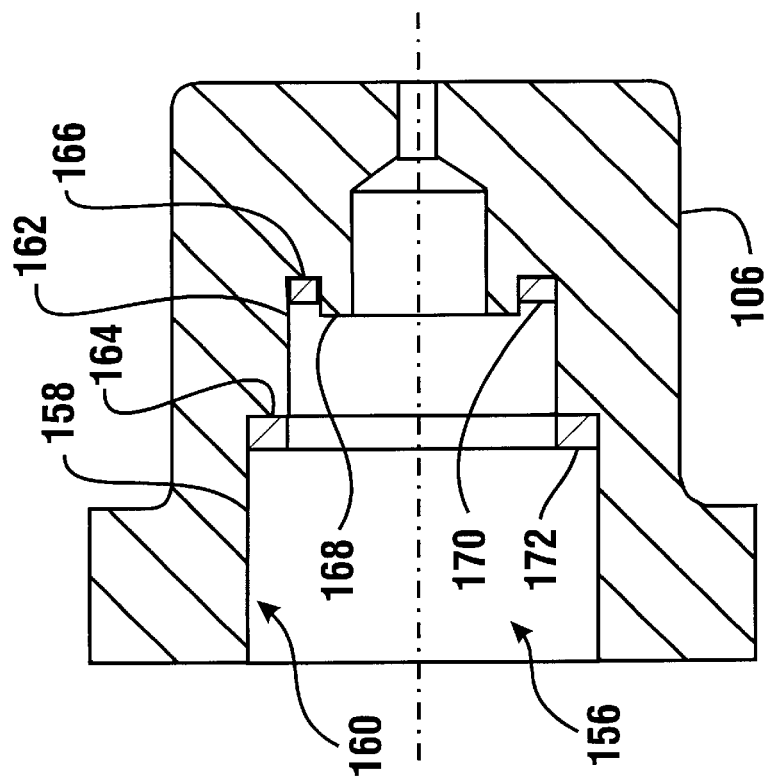
FIG. 14 is a cross sectional view of an eighth embodiment of a fitting body used in a joint of the present invention.

A further alternative fitting body 154 is shown in FIG. 14. Fitting body 154 is similar to the fitting body shown in FIG. 10 except as otherwise described. Fitting body 154 includes a bore 156 bounded by a bore wall 158. A bead formation area 160 extends in the bore adjacent the bore wall.

Fitting body 154 further includes a sleeve area 162. An annular step 164 extends between the sleeve area and bead formation area 160. The fitting body further includes an annular recess 166 adjacent the sleeve area. A cylindrical projection 168 bounds the annular recess.

A first annular seal 170 extends in nested relation in annular recess 166. A second annular seal 172 extends in bore 156 adjacent step 164. Second seal 172 is sized to include an opening through which a tube may be extended into the sleeve area. The opening is preferably sized so that the seal engages the outer surface of the tube. The seals are preferably comprised of resilient material.

The connecting joint of the invention is formed using fitting body 154 in a manner similar to that previously discussed. First seal 170 is operative to assist in providing a fluid tight seal between the fitting body and an inward end of a tube. Second seal 172 is operative to provide an enhanced fluid tight seal between the bead material of the tube in the bead formation area and the fitting body.

It should be understood that while the embodiment of the invention shown in FIG. 14 includes seals adjacent to the inward end of a tube and in the bead formation area, in other embodiments only one of such seals may be used. In addition, the seal construction of the embodiment shown in FIG. 14 may be used in combination with the o-ring seal construction shown in FIG. 13. The number and types of gasket structures used in embodiments of the invention can be tailored to the particular materials used to form the joint, as well as the temperature, pressure and type of material conducted through the joint. Gasket structures may include various resilient or non resilient materials. Such gaskets may be preformed materials comprised of items such as for example, elastomers of TFE, or formed in place gasketing or sealing materials.

Figure 18:
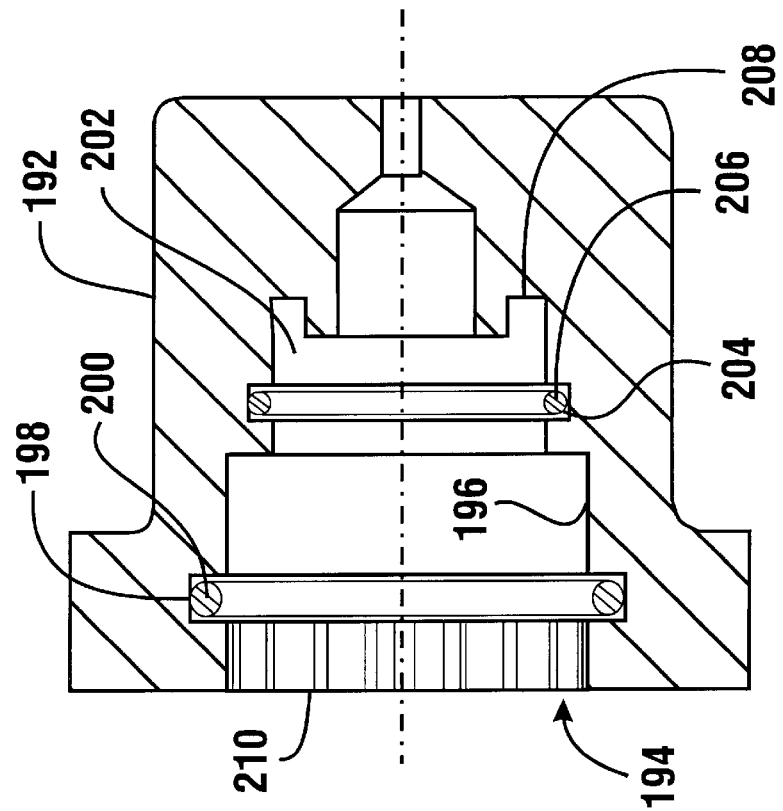
FIG. 18 is a cross sectional view of a tenth embodiment of a fitting body used in a joint of the present invention.
Figure 19:
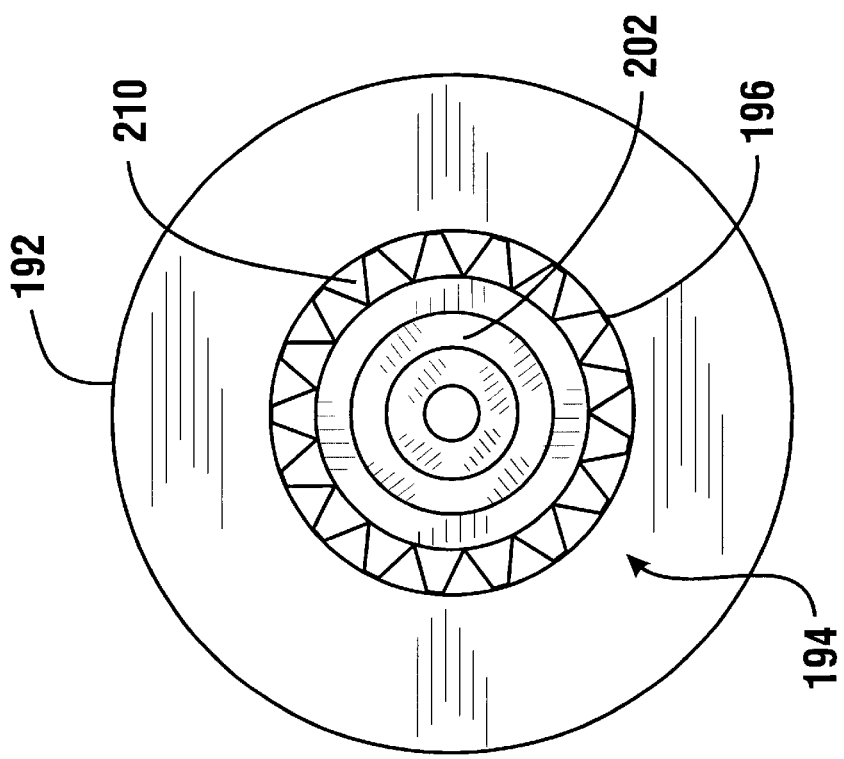
FIG. 19 is an end view of the fitting body shown in FIG. 18.

A further alternative fitting body 192 is shown in FIG. 18. Fitting body 192 is similar to fitting body 130 shown in FIG. 13 except as otherwise described. Fitting body 192 includes a bore 194. Bore 194 is bounded by a generally annular bore wall 196. Bore wall 196 includes an annular groove 198 in which an o-ring 200 is positioned.

Fitting body 192 further includes a sleeve area 202. Sleeve area 202 includes an annular groove 204 in which an o-ring 206 is positioned. Sleeve area 202 also includes a radially extending annular recess 208.

Bore wall 196 includes a plurality of serrations 210. Each serration is tapered to a point. Serrations 210 extend generally axially and radially inwardly from the bore wall 196, and are positioned adjacent to an axially outward end of the bore.

When one or more beads are formed in the fitting body 192 in the manner previously described, the beads which form in the bead formation area adjacent to bore wall 196 engage in interfitting relation with serrations 210. The engagement of the bead material and the serrations resists axial pullout of the tube from the fitting body. Such engagement further strongly resists relative rotational movement of the tube and the fitting body. This enhances resistance to separation and reduces failures of the joint due to twisting forces.

It should be understood that an alternative embodiment of the joint fitting body 192 may be modified to position the serrations in other areas adjacent the bore wall. In addition, one or both of the o-rings and their corresponding annular grooves may be omitted, or additional o-rings or other sealing structures added, depending on the particular temperature, pressure and material conditions under which the joint is required to operate.

Figure 20:
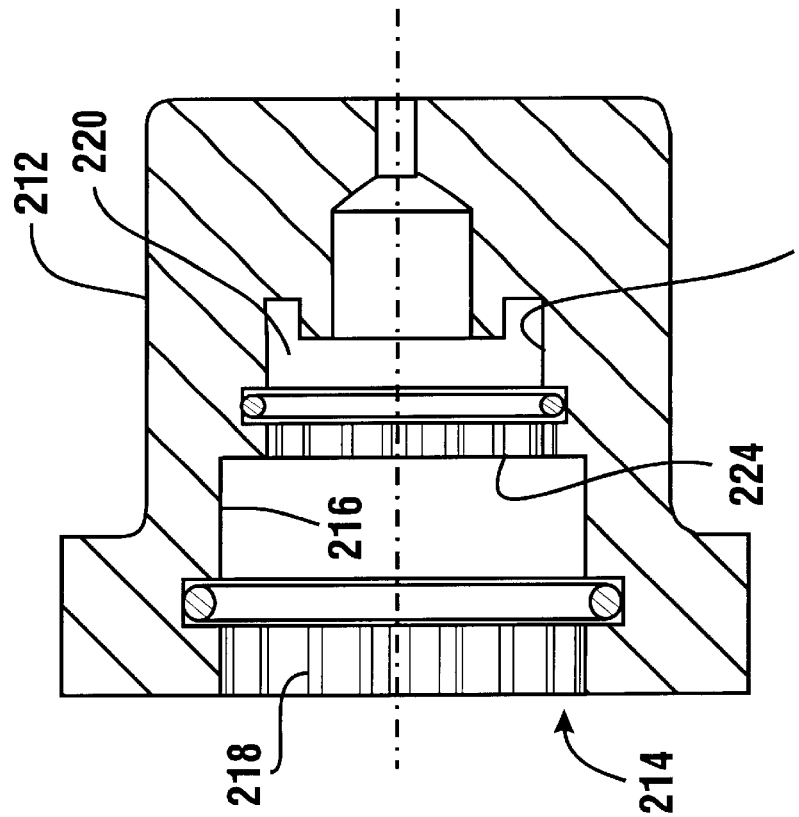
FIG. 20 is a cross sectional view of an eleventh embodiment of a fitting body used in a joint of the present invention.
Figure 21:
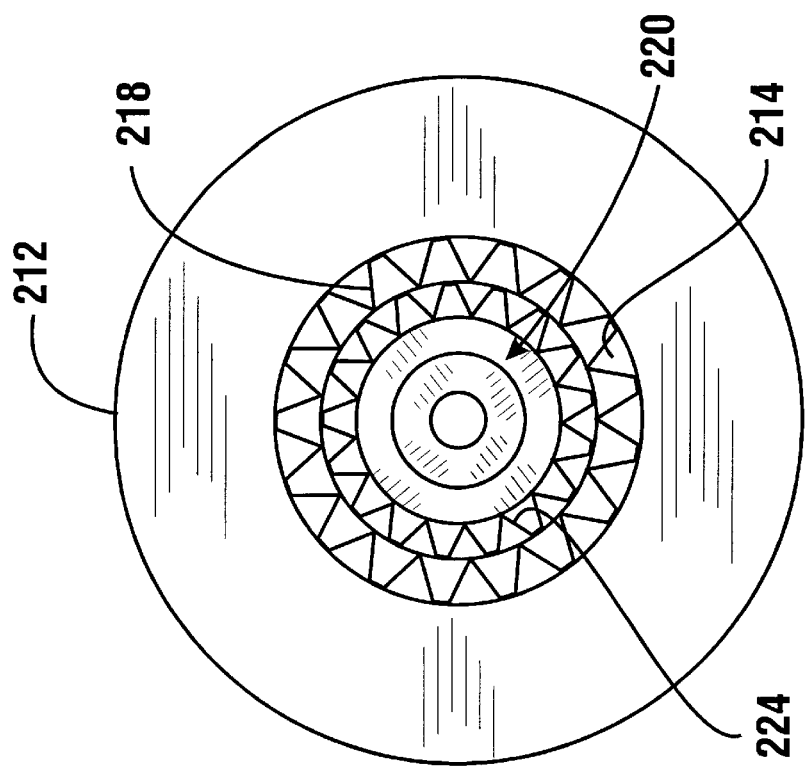
FIG. 21 is an end view of the fitting body shown in FIG. 20.

FIGS. 20 and 21 show a further alternative embodiment of a fitting body 212 used in connection with the joint of the present invention. Fitting body 212 is similar to fitting body 192 except as otherwise described. Fitting body 212 includes a bore 214. Bore 214 is bounded by a generally annular bore wall 216. Bore wall 216 includes serrations 218 similar to serrations 210 in fitting body 192.

Fitting body 212 further includes a sleeve area 220. Sleeve area 220 is bounded by sleeve area wall 222. Sleeve area wall 222 includes generally axially and radially inward extending tapered serrations 224 therein.

Serrations 224 are preferably sized to engage the outer wall of the tube as the tube is pressed into the sleeve area. Serrations 224 preferably engage and somewhat deform the outer surface of the tube material upon insertion of the tube into the sleeve area. This provides a first area of engagement between the fitting body 212 and the inserted tube which resists relative rotational movement. Upon formation of the joint in the manner previously discussed with reference to fitting body 192, one or more beads are formed in the tube in a bead formation area adjacent to the bore wall 216. The beads which are formed engage serrations 218 on the bore wall. Such engagement further serves to hold the tube axially and rotationally engaged with the fitting body.

It should be understood that the gasket structures shown in connection with fitting body 212 are exemplary. Only different or additional types of gasket structures as well as gasket materials may be used depending on the pressures, temperatures and materials involved.

Other embodiments of a joint connection of the present invention are discussed hereinafter for providing the secure engagement of a tube and a fitting body wherein only one outwardly extending tube bead may be required. However, plural inwardly extending tube beads may also be formed. The sole outwardly extending tube bead is formed to engage a bore wall in the fitting body in a tube deformation area in fixed flight tight engagement. FIGS. 22–27, for example, show such embodiments.

The formation of a retaining ridge on the fitting body provides additional support to the joint connection of the tube and fitting body. The retaining ridge and the tube beads may be formed either successively or simultaneously during joint formation. A tool may be used in forming the beads and the retaining ridge. The tube is compressed in at least an axial direction during formation of the beads, including the formation of the outwardly extending bead.

The body material may be deformed or crimped or shifted to form the retaining ridge. The retaining ridge may comprise a ridge, hook, lip, shoulder, or other retaining structure. The retaining ridge may be formed to retain or trap or lock the tube to the body. The retaining ridge may engage an outwardly extending bead of the tube. The distal end of the retaining ridge may extend toward the tube to a position either spaced from the tube, or at the tube outer surface, or inward of the tube outer surface (e.g., FIG. 25). The retaining ridge may be of constant or varying thickness, including a tapered or pointed surface. The retaining ridge may have a predetermined dimension or a predetermined angle toward the tube. The use of a retaining ridge in the joint formation arrangement increases resistant to pull apart of the joint connection.

The tube may be axially compressed along its axis by relative movement of the fitting body and the tool. The tube may also be radially compressed. As previously discussed, the tool may comprise a jaw or jaw assembly, including a split jaw assembly, for engaging or holding the tube. The jaw assembly may comprise a single component or a plurality of assembled components.

As previously discussed, for tube compression the body may be stationary and the tool moved, or the tool may be stationary and the body moved, or both the body and jaw may be moved. Additionally, as previously discussed, the fitting body may be positioned in a cavity in a retaining vice. The retaining vice, with the fitting body therein, may be moved relative to the tool.

The compression of the tube results in the forming of a projection, such as a bead, extending in a direction outward from the tube. The outward extending bead is formed to engage the bore wall in a tube deformation area or bead formation area in fixed fluid tight engagement. One, two, three, or more beads may be formed in different arrangements with at least one of the beads extending in the radially outward direction. For example, the formation of three beads in the tube may include one outward extending bead and two inward extending beads. The forming of the inner beads may assist in the forming of the outer bead and thus the engaging of the tube to the fitting body. An outer bead may be positioned generally intermediate of a pair of adjacent inner beads. One or more beads may be formed and remain in the bore area. Also, one or more other beads may extend outward from the bore opening. The beads may be formed of a projection of any usable shape for engaging the fitting tube, including having annular, straight, or flat surfaces. A recess in the bore wall, such as an axially extending bead formation area, may dictate the final shape of the bead.

FIGS. 22–27 show exemplary embodiments of the joint formation. These Figures show exemplary embodiments of the body, tube, and tool before impact, and the body and tube joint connection after impact. The joint formation may comprise a stake formation.

Figure 22:
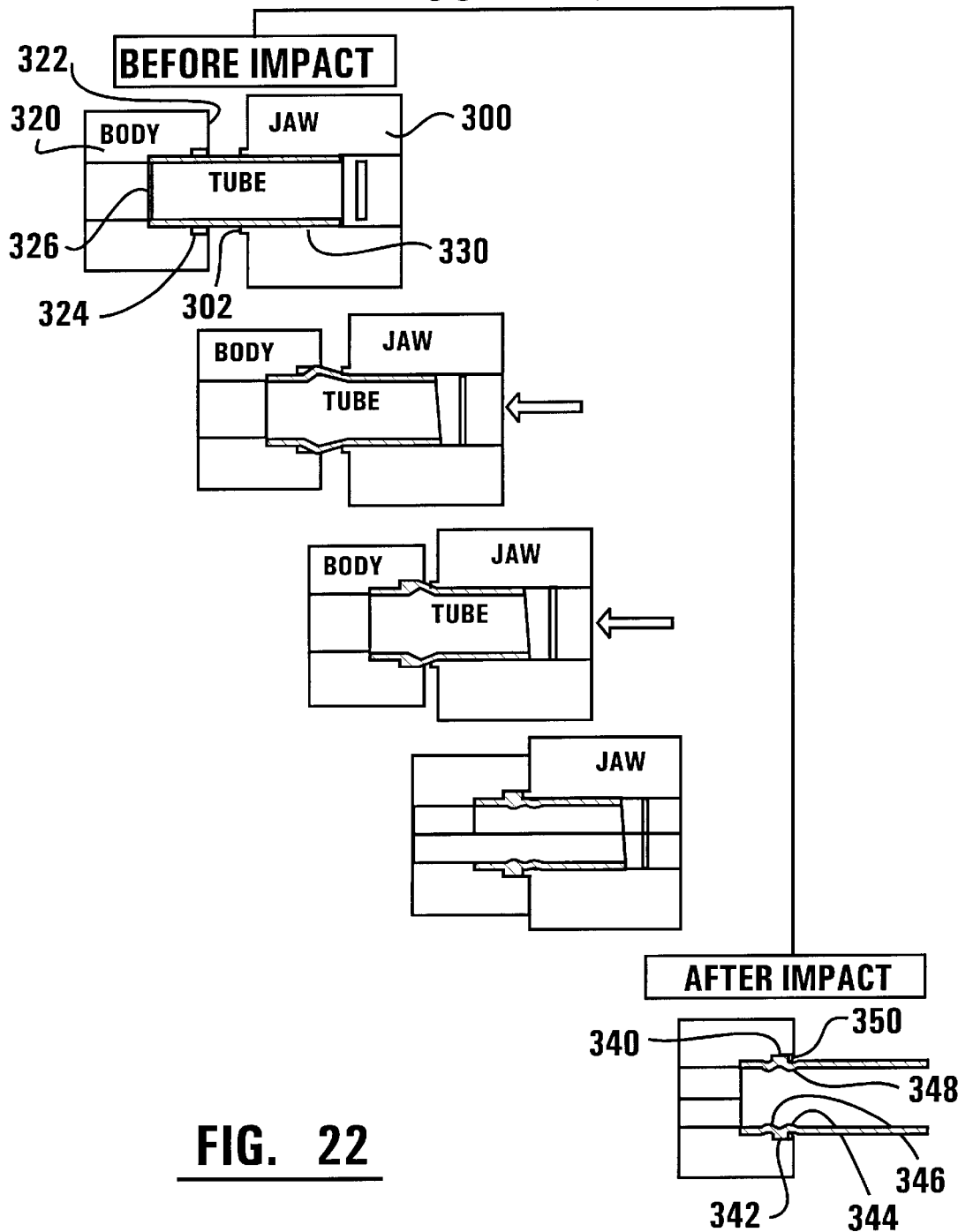
FIGS. 22–27 are different embodiments showing joint formations including an outwardly extending bead.

FIG. 22 shows a jaw 300 with an outwardly extending ring-like projection 302 on its face. The projection has a generally straight face. The outer edge of the projection face may extend back toward the jaw body at an angle or a curve. The fitting body 320 has a generally flat face 322 with a tube deformation area 324 in the bore 326. A tube 330 has an outward extending tube bead 340 formed in the tube deformation area where it is engaged by a retaining ridge 350. The outer bead 340 has a generally flat top portion 342 taken in cross section. Two inner beads 344, 346 are shown with one of the inner beads extending partly out of the bore opening 348. The outer bead is substantially intermediate the pair of inner beads.

Figure 23:
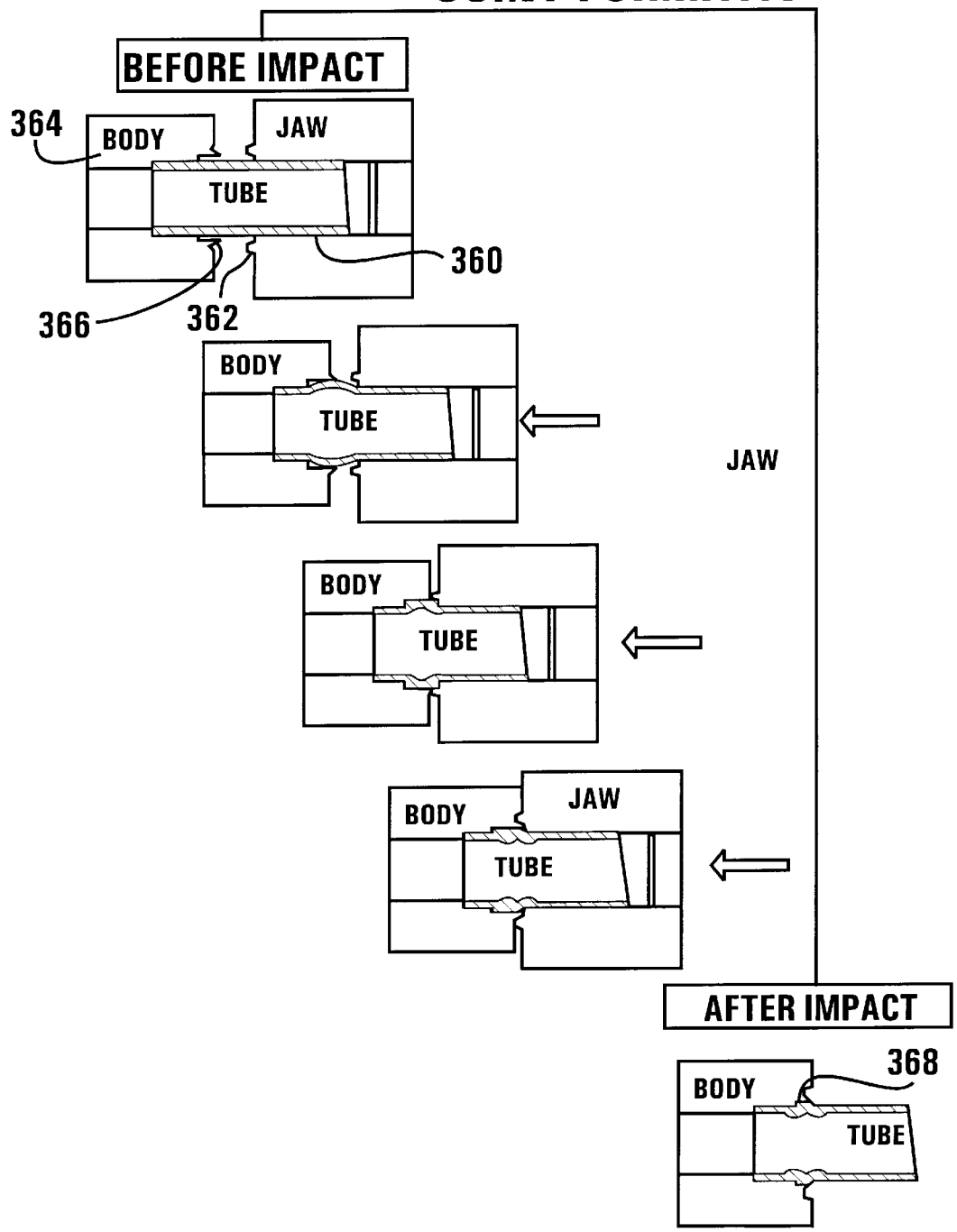

FIG. 23 shows a jaw 360 having a projection 362 that slopes back on both sides toward the jaw body. The projection may comprise a raised ring. The fitting body 364 has a relatively pointed projection 366 that angles back on at least one side into a recess in the body. During tube compression an angled surface of the jaw projection abuts with the angled surface of the body projection to force the body projection into contact with the formed tube bead 368.

In FIG. 23 the apex of the jaw projection is generally radially outside of the apex of the body projection. This arrangement permits the jaw projection to abut and deform the body projection inwardly toward the tube.

Figure 24:
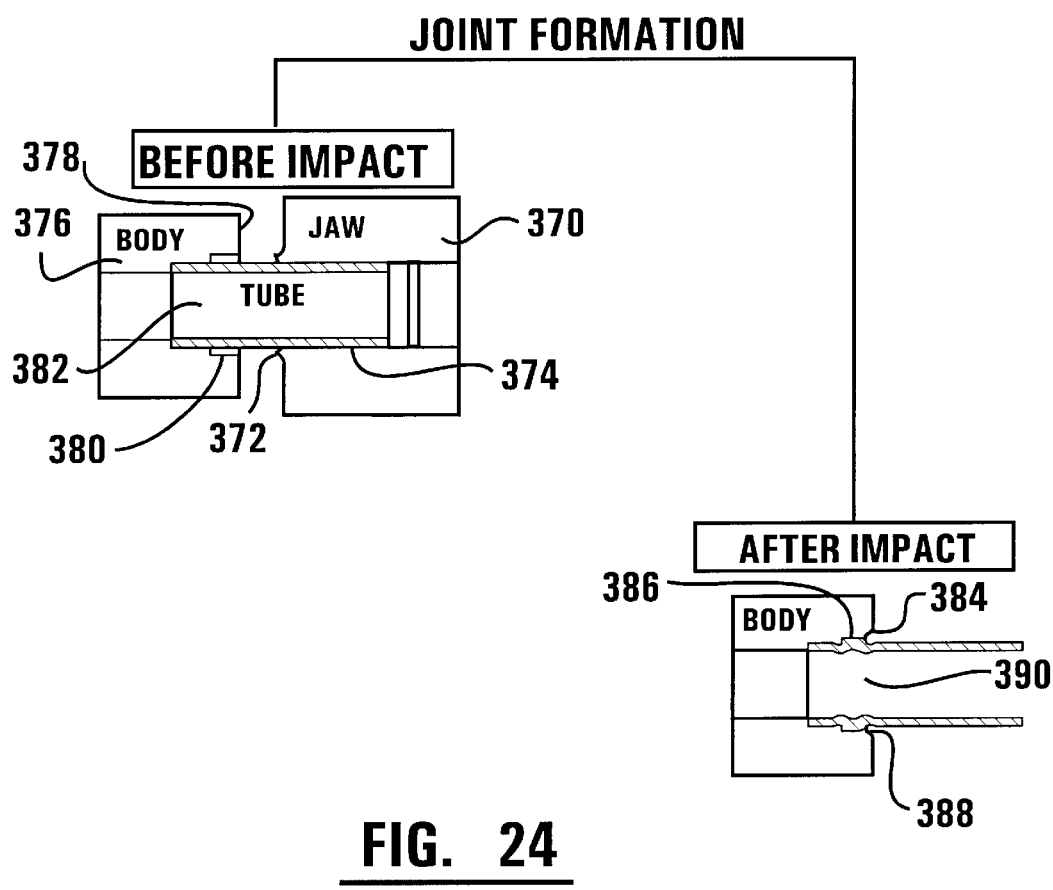

FIG. 24 shows a jaw 370 having a projection face 372 that angles away from the tube 374 and the jaw body. The outer edge of the projection face curves back toward the jaw body. The fitting body 376 has a generally flat face 378 with a tube deformation area 380 in the bore 382. The retaining ridge 384 forms a hook-like shape in abutting the outwardly extending bead 386. The fitting body after impact shows in cross section a curved corner portion 388 adjacent the bore opening 390.

Figure 25:
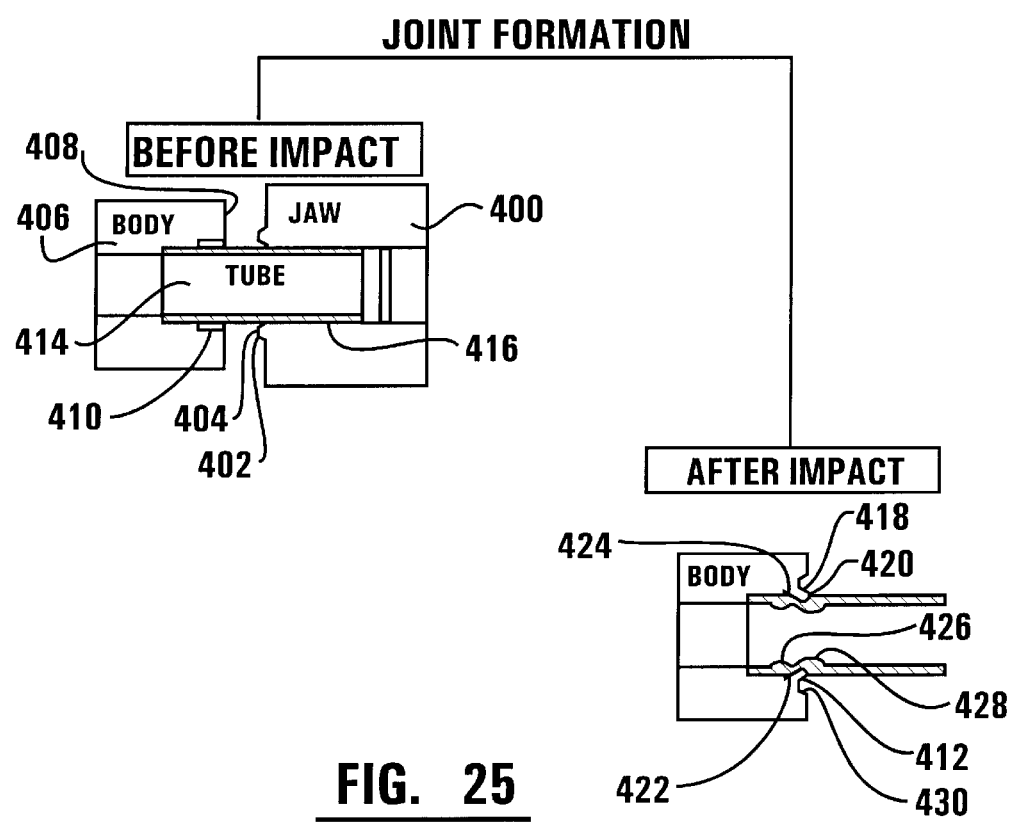

FIG. 25 shows a jaw 400 having a projection 402 with a generally flat face 404. The projection tapers back outwardly on both sides toward the jaw body. The fitting body 406 shows in cross section a curved portion 408 that joins the face with the tube deformation area 410. The formed retaining ridge 412 extends in the bore 414 inward into the tube 416. The retaining ridge extends both axially and radially. The retaining ridge in cross section has substantially parallel sides 418 joined by a substantially rounded end portion 420. The outer bead 422 has a generally pointed outer portion 424 taken in cross section. Two inner beads 426, 428 are shown with one of the inner beads larger than the other. One inner bead extends further radially inward than the other. After impact the fitting body is left with a recess 430 generally corresponding in shape to the jaw projection.

Figure 26:
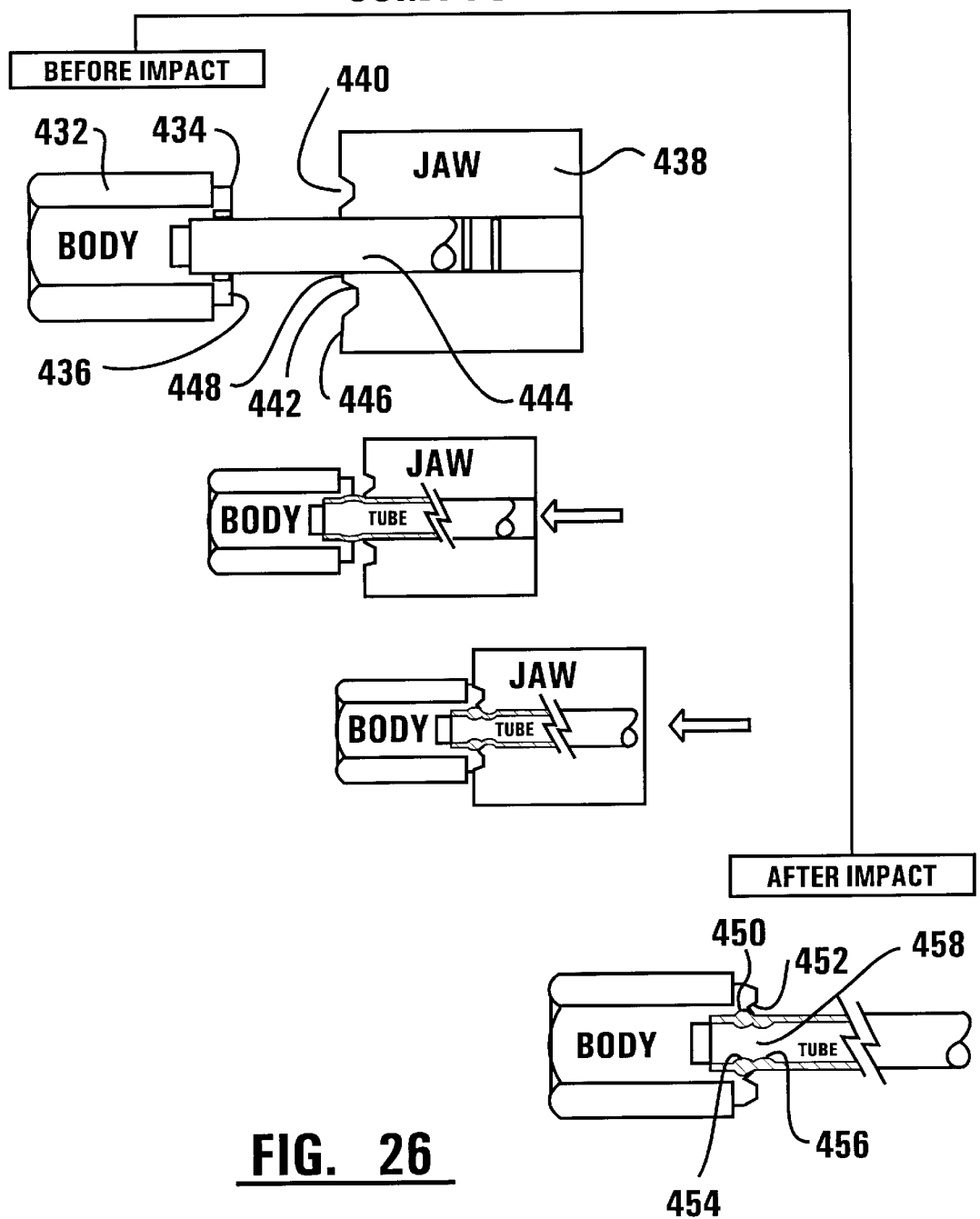

FIG. 26 shows the fitting body 432 having a projection 434 with a generally flat face 436. The projection may comprise a raised ring. The jaw 438 includes a recess 440 generally corresponding in radius to the fitting body projection. From the innermost recessed face 442 the jaw extends outwardly away from the tube 444 at an angle where it meets the outer face 446 of the jaw. A step 448 is positioned between the jaw's innermost recessed face and the engaged tube. The outer face of the jaw extends in a radial direction further from the recessed face than the does the step. During engagement of the body and jaw the body projection first abuts the angled surface of the jaw. This arrangement compresses the body projection inwardly until the innermost recessed face abuts the fitting body. The jaw step ensures that at least a portion of the body projection is forced inwardly to trap the formed outer bead 450 with the formed retaining ridge 452. As shown, the outer bead may be formed generally substantially radially opposite to an inner bead 454. Furthermore, another inner bead 456 may extend substantially out of the bore opening 458.

Figure 27:
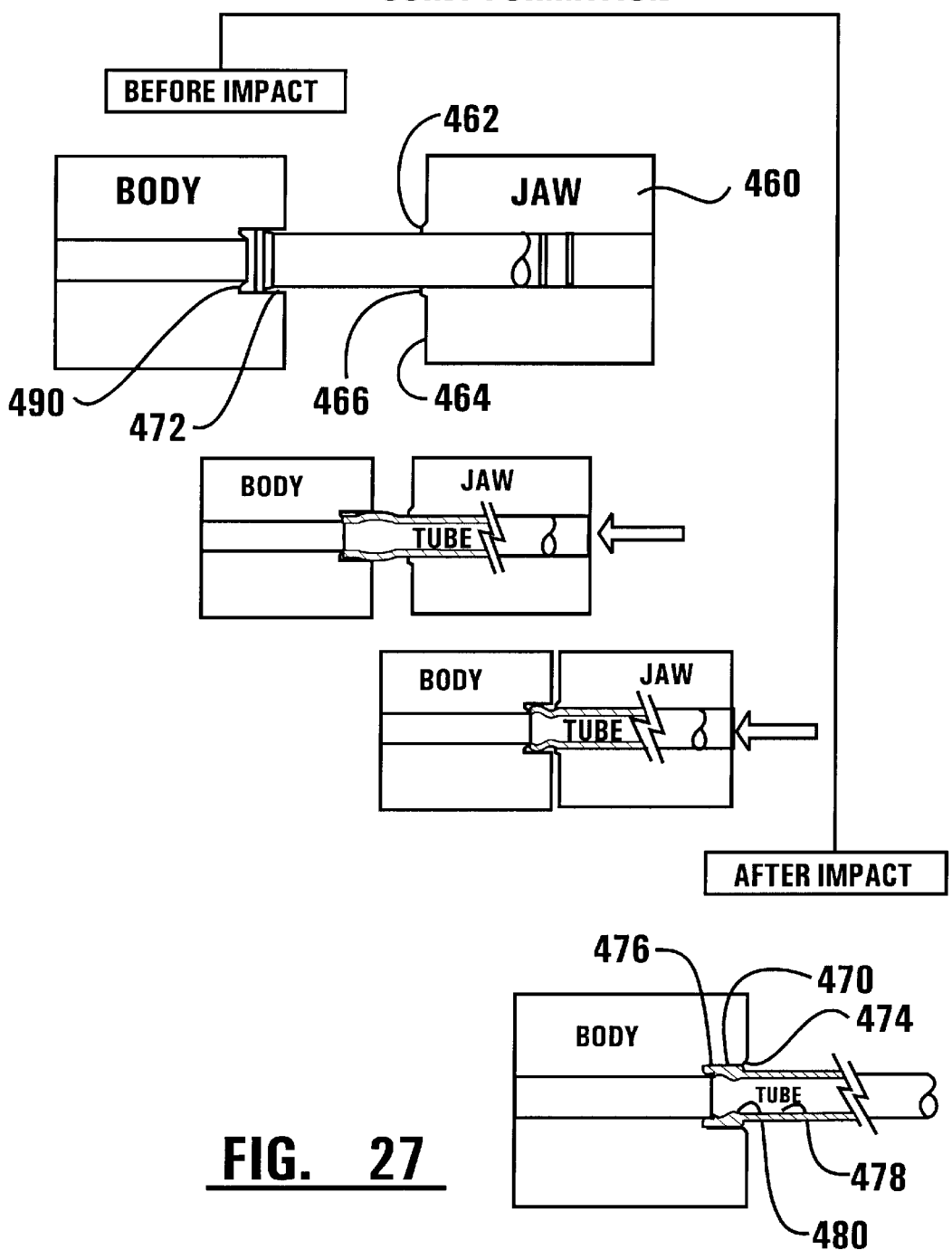
Figure 28:
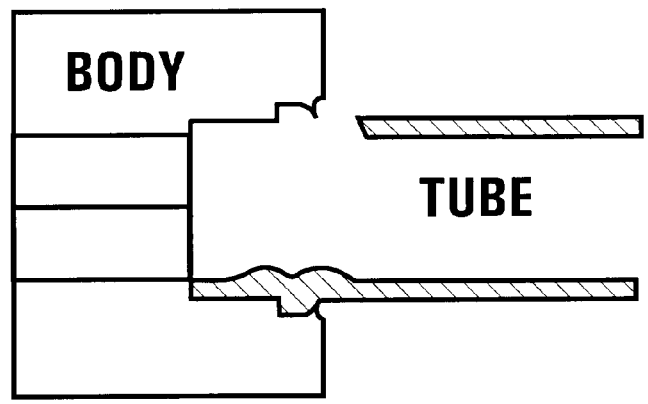
FIGS. 28–33 show potential after impact retaining ridge formations using the respective jaw and body arrangements of FIGS. 22–27.
Figure 29:
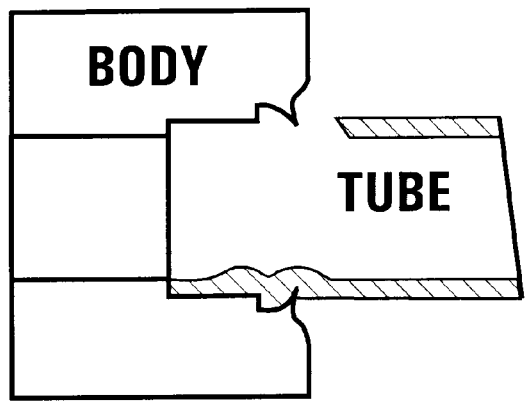
Figure 30:
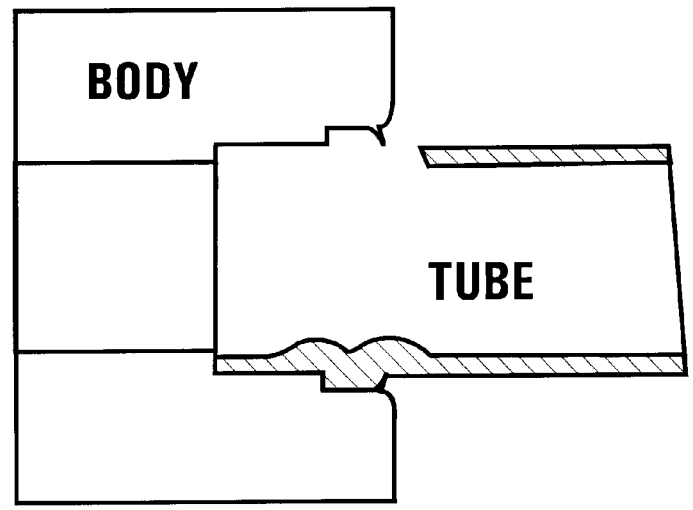
Figure 31:
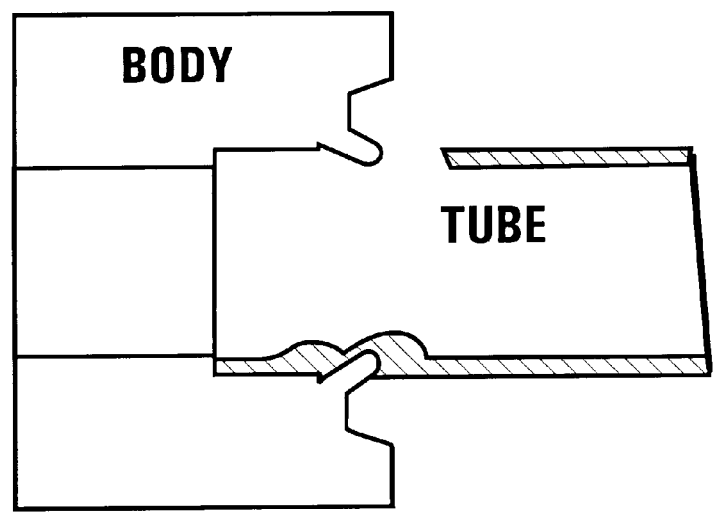
Figure 32:
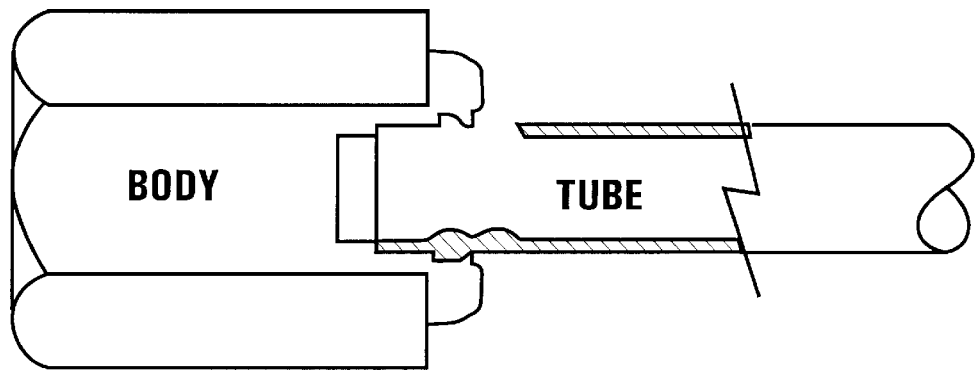
Figure 33:
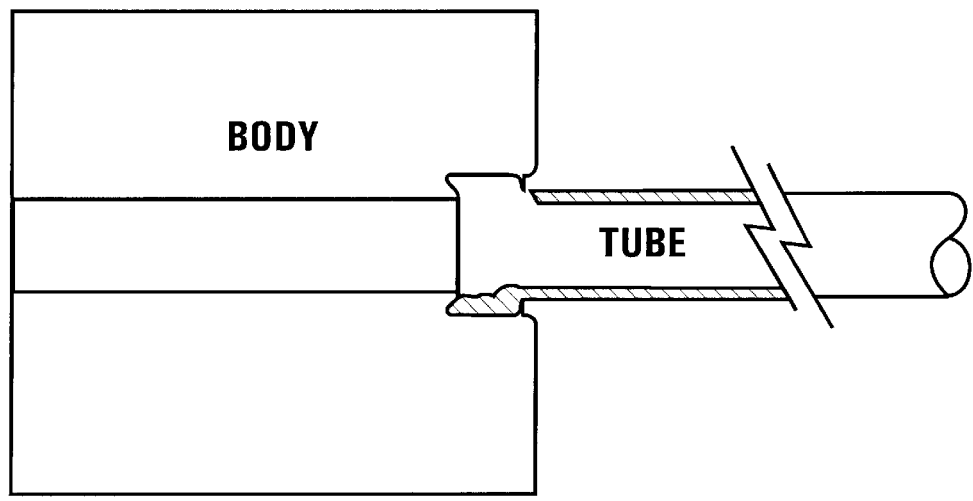

FIG. 27 shows a jaw 460 with an outwardly extending ring-like projection 462 on its face 464. The projection has a generally straight face 466 with a radially inner side abutting the tube. The outer edge of the projection face may extend back toward the jaw body at an angle or a curve. At least one outward extending tube bead 470 is formed in the tube deformation area 472 where it is engaged by a retaining ridge 474. The retaining ridge may comprise a thin flashing. The outer bead may have a generally flat outer portion 476 taken in cross section. Three inner beads are shown extending in the bore. One of the inner beads 480 extends radially inward of the tube's original inner surface 478. Two of the inner beads extend radially inward yet remain generally outward of the tube's original inner surface. The outer bead at least partly overlaps the inner beads.

FIGS. 28–33 show in cross section potential after impact retaining ridge formations using the respective jaw and body arrangements of FIGS. 22–27. The upper portions of the tube and beads have been excluded for clarity. Thus, the potential formation of the after impact retaining ridge is easier seen.

FIGS. 34–37 show in cross section additional potential retaining ridge and bore wall recess formations. The formations are shown with the upper portions of the tube and beads excluded for clarity. The formed retaining ridges are configured to engage and retain a bead secured in the bore wall recess.

Figure 34:
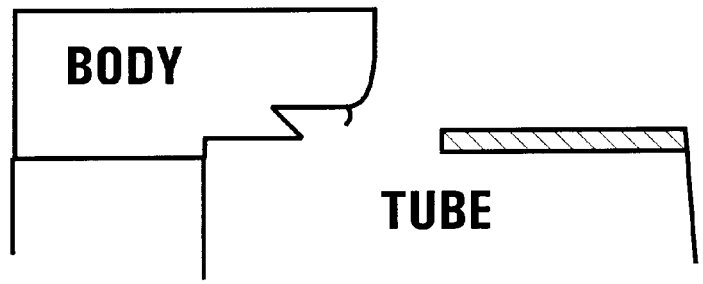
FIGS. 34–37 show additional potential retaining ridge formations.

FIG. 34 shows a body having a bore wall recess with a side wall angled away from the tube and toward the body. The retaining ridge is arranged to hook an outer bead.

Figure 35:
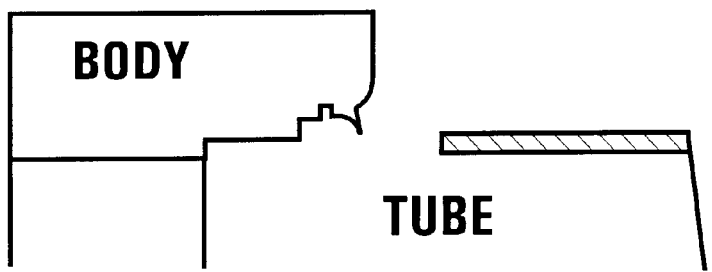

FIG. 35 shows a body having a bore wall recess with an additional outwardly directed keyed recess. The retaining ridge is directed toward the tube to secure an outer bead.

Figure 36:
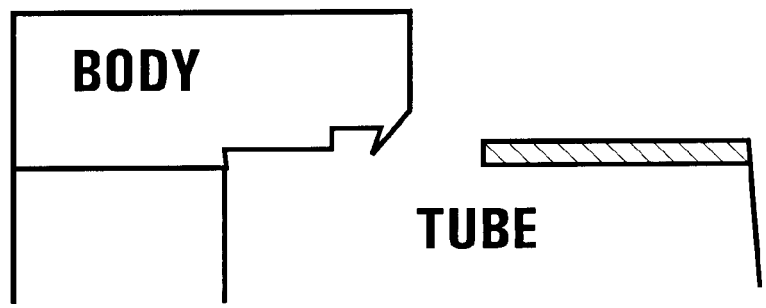

FIG. 36 shows a retaining ridge directed inward toward the body and tube to retain an outer bead in the bore wall recess.

Figure 37:
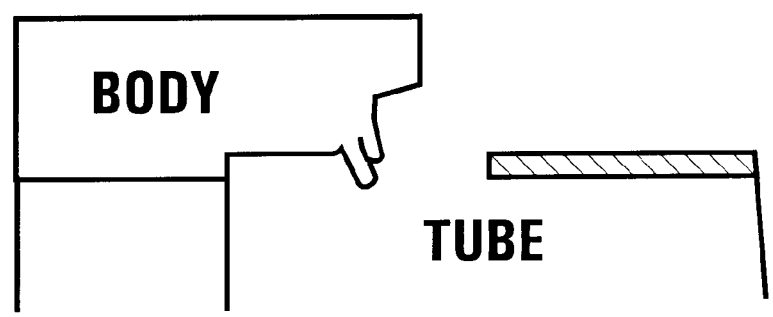

FIG. 37 shows layers of retaining ridges abutting each other to capture an outer bead. One or more jaws may be used to form the plural retaining ridges. A second jaw may comprise a ramming jaw that does not engage the tube. The second jaw may comprise sections radially movable for positioning prior to impact. With plural retaining ridges, even if the bead engaging ridge should become substantially removed the other backup ridge would still be positioned to assist in retaining the bead.

Figure 38:
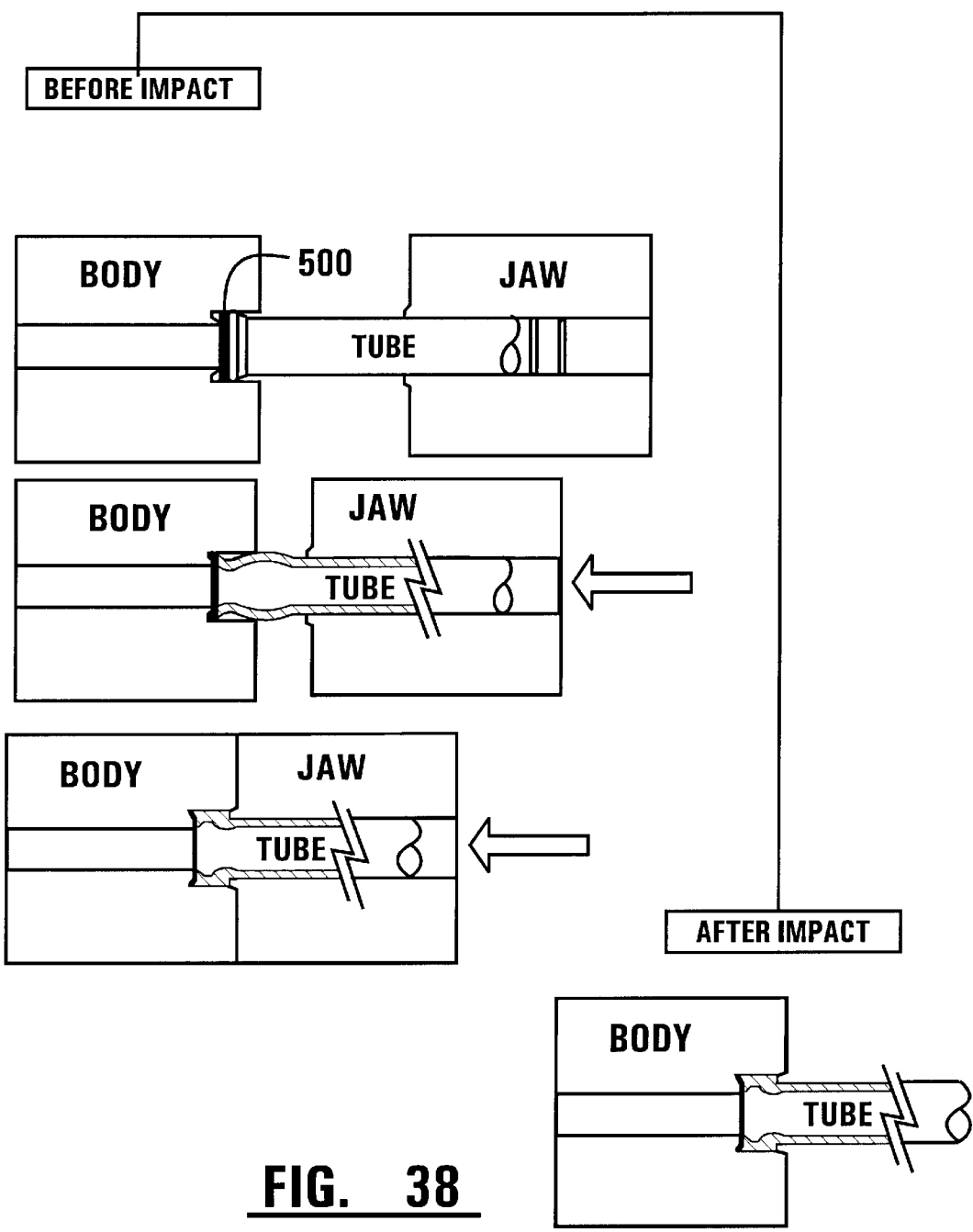
FIG. 38 shows a joint formation with added moldable material.

FIG. 38 shows an exemplary embodiment with moldable material 500 added to the process. The moldable material may be used to provide supplemental sealing and an improved seal in general for the joint. For example, moldable material may be added to provide supplemental sealing for porous material. The arrangement shown in FIG. 38 is similar to the arrangement shown in FIG. 27 with the addition of moldable material. Of course it should be understood that moldable material may be used in the other exemplary embodiments of the joint formation discussed herein.

Figure 39:
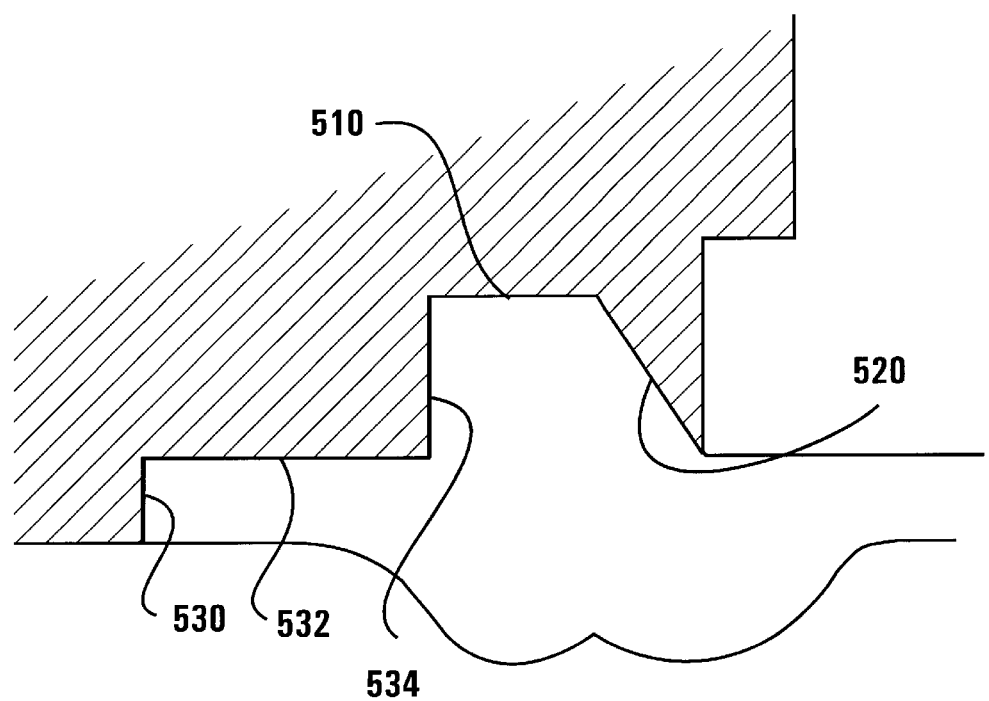
FIG. 39 shows a joint formation having a seal arrangement.

FIG. 39 shows an exemplary embodiment of a joint and its seal arrangement. The seal arrangement may comprise a primary sealing surface 510, a secondary sealing surface 520, and additional sealing surfaces 530, 532, 534. Primary sealing may occur adjacent the tube deformation area. A radial sealing force from tube deformation may help form the primary seal. Secondary sealing may comprise a "relaxed" sealing surface adjacent the retaining ridge. As the tool compresses the mass of the bead and withdraws, the mass may relax in the direction of the retaining ridge to provide a secondary sealing surface and improve the joint. A sealing force with radial and axial components from the tube deformation may help form the secondary seal. The additional sealing surfaces enhance the sealing in general for the joint. The arrangement shown is an after impact arrangement. Of course it should be understood that the type of sealing features shown, or other similar sealing features, may occur with the other exemplary embodiments of the joint formation discussed herein. It should also be understood that resilient seals and/or moldable material may also be included in the formation of a particular seal arrangement.

Of course it should be understood that the present invention is not limited to the embodiments shown and that other configurations of retaining ridges and bore wall recesses are within the scope of the present invention.

It should be understood that for use in a joint formation both the body and the jaw assembly may each include a raised ring or projection prior to impact, such as shown in FIG. 23. It is also within the scope of this invention to provide either or both the jaw assembly and the body with recesses and projections. The projections may be unitary or non-unitary or integral or non-integral with the jaw assembly and/or the body fitting. Furthermore, the projections may additionally be heated for use in forming the retaining ridges, including heatings at different temperatures. Conductive, convective, resistance, electric, vibrational, or other conventional and unconventional heating arrangements may be used.

The body may also be provided with a stop face for the tube. The stop face may comprise a predetermined shaped seal, including a stepped seat or a flared seat. FIG. 27 shows a fitting body having a flared seat 490. The flared seat may be an SAE 45 degree flare seat. A flared seat enables a tube having a flared end portion to be placed in supporting engagement with the stop face of a body fitting. It should be understood that the seat may be configured to have other angles, such as from zero to ninety degrees or ever greater. The fitting body bore may be dimensioned to engage the tube in a snug fit to securingly engage the tube to the fitting body prior to impact. Therefore, the body bore and stop face may be designed to conform directly to the dimensions of a tube's end portion.

As previously discussed, the jaw assembly may include a raised ring or projection on its face, as shown for example in FIGS. 22–25 and 27. Of course the fitting body may also comprise a raised ring or projection, as shown for example in FIGS. 23 and 26. A raised ring may be continuous or separated. A raised ring may also be angled, such as angled inward toward the tube. The angle may be predetermined. The angled arrangement serves to compress fitting body material inward during impact with the jaw assembly. The body material is capable of being rolled over into the cavity or bore of the fitting body. After impact of the jaw assembly and the body, the body may be left with a recess on its face wherein previous body material was deformed during the forming of the retaining ridge.

The jaw assembly may include one or more projections, including annular, spaced, or angled nose projections on its face thereof. For example, the jaw projection may comprise a raised ring having an annular bull nose. The jaw may comprise a punch. A plurality of projections may be arranged such that they form layers of retaining ridges. For example, plural retaining ridges may be formed to extend into or adjacent the bore. These retaining ridges may be adjacently arranged to provide additional support to the initial formed retaining ridge and/or preceding retaining ridges. The formed retaining ridges may be of different thicknesses or dimensions. They may also abut or overlap each other.

The tube deformation area may comprise a recess in the bore wall of the fitting body. The tube deformation area may further include spaced radial indentations forming a key pattern in a perimeter of the bore wall. Hence, deformed portions of the tube, such as beads, may be pushed into these key holes to provide additional locking support or sealing to the joint formation. Thus, resistance to pull apart of the joint connection may be further increased.

As previously discussed, a joint connection is operable to attach a fitting body and tube. The tube includes a longitudinal axis, an axially extending inner surface, an axially extending outer surface, and an end portion. The tube end portion includes a tube end face. The tube end portion may also include an outwardly extending projection and two adjacent inwardly extending projections. These projections may comprise deformed portions of the tube, such as beads. The outwardly extending projection extends radially outward from the outer surface. The inwardly extending projections extend radially inward from the inner surface.

The body may be in fixed fluid tight engagement with the tube end portion. The tube end portion may extend at least partly into a bore of the body so that the body at least partially surrounds the tube end portion. The body may include a stop face on which the tube end face engages. The stop face may extend radially and annularly. The bore may be bounded by a generally axially extending bore wall. A bore opening is adjacent an outer surface of the body. The bore wall may include a radially and annularly and axially extending recess into which the outwardly extending projection may extend in a fixed fluid tight engagement. The recess may be annular. The outwardly extending projection may substantially fill the recess.

A side of the recess located nearest the bore opening may be at least partially formed by a retaining ridge. The retaining ridge may engage the outwardly extending projection to increases resistance to pull apart of the joint connection. The retaining ridge may comprises a deformed portion of the body. Optionally, the retaining ridge may be a separate component integrally attached to the body, such as by welding. Furthermore, an additional retaining ridge may be formed or attached after or during the formation or attachment of a preceding retaining ridge. The retaining ridge may be adjacent a recess formed in the outer surface of the body.

An apex of the outwardly extending projection may be generally axially intermediate of apexes of the inwardly extending projections.

The retaining ridges described herein may be used in the formation of joint connections with regard to any of the previous embodiments.

As is apparent from the foregoing description, the tube and fitting bodies which are used to form the connecting joints of the present invention have a relatively simple geometry which is readily manufactured. In addition, formation of the joints is accomplished through novel processes which enable the joints to be quickly formed at high speed using automated equipment. This further reduces costs.

It should further be understood that while the exemplary embodiments of the joints shown include fitting bodies with bores that have generally axially extending walls which engage the beads, other embodiments may have walls which are tapered. As a result, such embodiments of the invention with tapered walls are considered as generally axially extending for purposes of this invention.

Further, those skilled in the art of tube fittings and connectors will be enabled to devise other configurations for joints which constitute embodiments of the present invention. From the examples presented herein, such other embodiments may be devised which have a wide range of configurations which incorporate the principles of the invention and which may be tailored to the particular operating environment in which the joint connection will be used. Further, the method described for forming the joints and the equipment used in connection therewith are merely exemplary, and those skilled in the art may devise numerous alternatives within the scope of the present invention.

Thus, the conduit connector and method of the present invention achieves at least one of the above stated objectives, eliminates difficulties encountered in the use of prior connectors and methods, solves problems and attains the desirable results described herein.

In the foregoing description certain terms have been used for brevity, clarity and understanding, however no unnecessary limitations are to be implied therefrom because such terms are used for descriptive purposes only and are intended to be broadly construed. Moreover, the descriptions and illustrations given herein are by way of examples and the invention is not limited to the exact details shown or described.

Further, in the following claims any feature described as a means for performing a function shall be construed as encompassing any means capable of performing the recited function and shall not be deemed limited to the particular means for performing the function shown herein or mere equivalents.

Having described the features, discoveries and principles of the invention, the manner in which it is constructed and utilized, and the advantages and useful results attained; the new and useful structures, devices, elements, arrangements, parts, combinations, systems, equipment, operations, methods and relationships are set forth in the appended claims.

We claim:

1. A joint connecting a tube and a fitting body made by a process comprising the steps of:
   extending a tube in a bore in a fitting body, wherein the bore is bounded by a bore wall, the bore wall including a generally axially extending bead formation area generally radially disposed from the tube when the tube is first extended therein;
   engaging an inward end of said tube against a stop face supported on the fitting body in the bore;
   compressing the tube in at least an axial direction in the bore to form at least one outward extending bead in the tube in the bead formation area and at least two inward extending beads in the tube, and wherein the tube engages the bore wall in the bead formation area in fixed fluid tight engagement;
   deforming a portion of the fitting body to form a bead retaining ridge;
   wherein the joint comprises
   a tube,
      wherein the tube includes at least one outward extending bead and at least two inward extending beads,
         wherein the beads comprise deformed portions of the tube,
   a fitting body,
      wherein the fitting body includes a bore bounded by a bore wall,
      wherein the fitting body is in fixed fluid tight engagement with the tube,
      wherein the fitting body includes a deformed portion comprising a bead retaining ridge,
         wherein the bead retaining ridge engages an outward extending bead.

2. The joint according to claim 1 wherein an outward extending bead includes an apex, and wherein the apex engages the bore wall in fixed fluid tight engagement.

3. The joint according to claim 2 wherein the bore wall includes a recess into which the apex extends in fixed fluid tight engagement.

4. The joint according to claim 3 wherein the bead retaining ridge engages the outward extending bead having the apex.

5. The joint according to claim 3 wherein an outward extending bead is generally intermediate two adjacent inward extending beads.

6. The joint according to claim 3 wherein the tube includes only one outward extending bead and only two inward extending beads.

7. The joint according to claim 3 wherein the portion of the fitting body is deformed by engagement with a tool.

8. The joint according to claim 7 wherein the tool includes a jaw assembly, wherein the portion of the fitting body is deformed by engagement with the jaw assembly.

9. The joint according to claim 8 wherein the jaw assembly includes a recessed ring.

10. The joint according to claim 8 wherein the jaw assembly includes a projection on a face thereof.

11. The joint according to claim 10 wherein the projection comprises a raised ring.

12. The joint according to claim 11 wherein the raised ring includes an inner edge and an outer edge, wherein the edges slope toward the jaw assembly at different angles.

13. The joint according to claim 11 wherein during engagement of the jaw assembly with the fitting body the raised ring causes body material to be rolled over into the bore to increase resistance to pull apart.

14. The joint according to claim 8 wherein the fitting body includes a projection on a face thereof.

15. The joint according to claim 14 wherein the projection comprises a raised ring.

16. The joint according to claim 15 wherein during engagement of the jaw assembly with the body the raised ring is compressed and forced inwardly to engage the outward extending bead.

17. The joint according to claim 16 wherein the jaw assembly includes a recessed ring, wherein the raised ring is compressed and forced inwardly by engagement with the recessed ring.

18. The joint according to claim 8 wherein the process of making the joint further comprises the step of engaging the tube with the jaw assembly.

19. The joint according to claim 18 wherein the tube is compressed by movement of the jaw assembly relative to the fitting body.

20. The joint according to claim 7 wherein the deformed fitting body engages the outward extending bead with a hook shaped engagement.

21. The joint according to claim 3 wherein the fitting body includes a tube flare seat in the bore for supporting a flared tube.

22. The joint according to claim 21 wherein the tube flare seat extends at a generally 45 degree angle.

23. The joint according to claim 3 wherein the retaining ridge extends both axially and radially inward in the bore.

24. The joint according to claim 3 wherein the retaining ridge is annular and extends adjacent an opening to the bore.

25. The joint according to claim 1 wherein the retaining ridge increases resistance to pull apart.

26. The joint according to claim 1 wherein the bore wall is generally axially extending.

27. The joint according to claim 1 wherein the bore wall is tapered.

28. The joint according to claim 1 further comprising a moldable material.

29. The joint according to claim 3 including a primary seal adjacent the apex and a secondary seal adjacent the retaining ridge.

30. A joint connection comprising:
  a tube,
    wherein the tube includes a longitudinal axis,
    wherein the tube includes an axially extending inner surface,
    wherein the tube includes an axially extending outer surface,
    wherein the tube includes an end portion,
      wherein the tube end portion includes a tube end face,
      wherein the tube end portion includes an outwardly extending projection and two adjacent inwardly extending projections,
        wherein the projections comprise deformed portions of the tube,
        wherein the outwardly extending projection extends radially outward from the outer surface,
        wherein the inwardly extending projections extend radially inward from the inner surface,
  a fitting body,
    wherein the body is in fixed fluid tight engagement with the tube end portion,
    wherein the body at least partially surrounds the tube end portion,
    wherein the body includes a stop face on which the tube end face engages,
      wherein the stop face extends radially and annularly,
    wherein the body includes an outer surface,
    wherein the body includes a bore bounded by a generally axially extending bore wall,
    wherein the bore includes a bore opening adjacent the outer surface,
    wherein the bore wall includes a radially and annularly and axially extending recess into which the outwardly extending projection extends in fixed fluid tight engagement,
    wherein the recess includes a recess wall adjacent the bore opening,
    wherein the recess wall is at least partially formed by a retaining ridge,
      wherein the retaining ridge comprises a deformed portion of the body,
      wherein the retaining ridge engages the outwardly extending projection,
  wherein the fitting body outer surface includes a surface recess adjacent the retaining ridge.

31. The joint according to claim 30
  wherein the outwardly extending projection includes an apex,
  wherein the inwardly extending projections each include an apex,
  wherein the outwardly extending apex is generally axially intermediate the inwardly extending apexes.

32. The joint according to claim 30 wherein the projections comprise beads.

33. The joint according to claim 30 wherein the retaining ridge is annular.

34. A joint connection comprising:
  a tube,
    wherein the tube includes an axially extending inner surface,
    wherein the tube includes an axially extending outer surface,
    wherein the tube includes a tube end face,
    wherein the tube includes an outwardly extending projection and two inwardly extending projections,
      wherein the projections comprise deformed portions of the tube,
      wherein the outwardly extending projection extends radially outward from the outer surface,
        wherein the outwardly extending projection includes an apex,
      wherein the inwardly extending projections extend radially inward from the inner surface,
  a fitting body,
    wherein the fitting body includes a stop face on which the tube end face engages,
    wherein the fitting body includes a bore bounded by a bore wall,
      wherein the apex engages the bore wall in a fixed fluid tight engagement.

35. The joint according to claim 34 wherein the fitting body includes a deformed portion comprising a retaining ridge, wherein the retaining ridge engages the outwardly extending projection.

36. The joint according to claim 34 wherein the projections comprise beads.

* * * * *